(12) United States Patent
Takagi et al.

(10) Patent No.: US 10,958,841 B2
(45) Date of Patent: Mar. 23, 2021

(54) INTEGRATED IMAGE SENSOR AND DISPLAY PIXEL

(71) Applicant: Intel Corporation, Santa Clara, CA (US)

(72) Inventors: Akihiro Takagi, San Mateo, CA (US); Kunjal Parikh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/400,774

(22) Filed: Jan. 6, 2017

(65) Prior Publication Data

US 2018/0198980 A1    Jul. 12, 2018

(51) Int. Cl.
| | |
|---|---|
| *H04N 5/232* | (2006.01) |
| *H04N 5/374* | (2011.01) |
| *G06K 9/00* | (2006.01) |
| *H04N 13/204* | (2018.01) |
| *H04N 5/225* | (2006.01) |
| *G06K 9/20* | (2006.01) |
| *H04N 9/04* | (2006.01) |
| *G02B 13/00* | (2006.01) |

(52) U.S. Cl.
CPC ..... *H04N 5/23293* (2013.01); *G06K 9/00255* (2013.01); *G06K 9/00288* (2013.01); *G06K 9/00604* (2013.01); *G06K 9/2018* (2013.01); *H04N 5/2257* (2013.01); *H04N 5/22525* (2018.08); *H04N 5/374* (2013.01); *H04N 9/0451* (2018.08); *H04N 13/204* (2018.05); *G02B 13/0085* (2013.01)

(58) Field of Classification Search
CPC ...... H04N 5/23293; H04N 5/33; H04N 5/374; H04N 13/0203; H04N 2213/001; G02B 13/0085; G06K 9/00255; G06K 9/00288
See application file for complete search history.

(56) References Cited

U.S. PATENT DOCUMENTS

| | | | | |
|---|---|---|---|---|
| 9,749,562 | B2* | 8/2017 | Goto | H04N 5/3696 |
| 2009/0315869 | A1* | 12/2009 | Sugihara | G06F 1/1605 |
| | | | | 345/204 |
| 2010/0066800 | A1* | 3/2010 | Ryf | H04N 7/144 |
| | | | | 348/14.01 |
| 2015/0268754 | A1* | 9/2015 | Chang | G09G 3/3413 |
| | | | | 345/175 |
| 2016/0041663 | A1* | 2/2016 | Chen | G06F 3/0412 |
| | | | | 345/174 |

* cited by examiner

*Primary Examiner* — Twyler L Haskins
*Assistant Examiner* — Fayez Bhuiyan
(74) *Attorney, Agent, or Firm* — Hanley, Flight & Zimmerman, LLC

(57) ABSTRACT

In one example, a display includes an array of display pixels. Each display pixel includes at least one light-emitting diode. At least one of the display pixels includes an image sensor.

27 Claims, 14 Drawing Sheets

100

300

600

700

INTEGRATED IMAGE SENSOR AND DISPLAY PIXEL

TECHNICAL FIELD

This disclosure relates generally to integrated image sensor and display technologies.

BACKGROUND

Displays based on light-emitting diodes (LEDs) such as organic light-emitting diodes (OLEDs) and/or inorganic micro light-emitting diodes (also referred to as micro LEDs or μLEDs) may be used for applications in emerging portable electronics and wearable computers (for example, computing devices, laptop computers, mobile devices, tablets, phones, head mounted displays, head worn displays, wristwatches, wearable watch displays, Virtual Reality displays, Augmented Reality displays, OLED displays, micro LED displays, etc).

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

Figure 1:
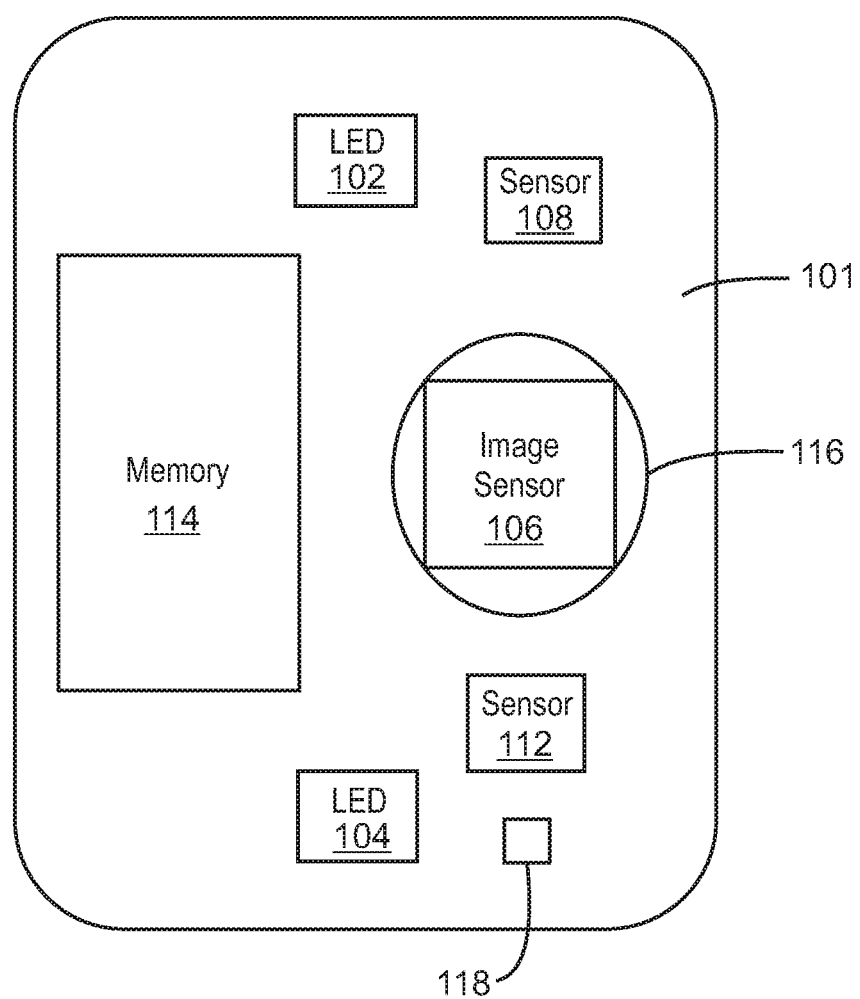
FIG. 1 illustrates a light-emitting diode (LED) display pixel.

Some embodiments relate to displays, mobile displays, light-emitting diode (LED) displays, and/or micro light-emitting diode (μLED) displays. Some embodiments relate to integrating technologies (for example, image sensor and/or camera and/or camera sensor technologies) with display technologies (for example, mobile display, light-emitting diode (LED) display, and/or micro light-emitting diode (μLED) display technologies). Some embodiments relate to including image sensor and/or camera and/or camera sensor technologies with one or more display pixel (for example, one or more mobile display, light-emitting diode (LED) display, and/or micro light-emitting diode (μLED) display pixel). Some embodiments relate to integrating technologies for example, camera, image sensor, camera sensor, sensor, storage, and/or memory technologies) with a display pixel (for example, one or more mobile display, light-emitting diode (LED) display, and/or micro light-emitting diode (μLED) display pixel).

The terms integrate, integrating, integrated, etc. are used herein as being included together. For example, an image sensor (and/or other type of sensor) is integrated with a display pixel LED in some embodiments. In some embodiments, integrate, integrating, integrated, etc. of the devices includes embodiments in which the devices are included together and not necessary integrated together in one integrated circuit, but can be integrated together in one integrated circuit in some embodiments. In some embodiments, the devices are included on a same substrate. For example, in some embodiments, one or more sensors is integrated (for example, included) on a same substrate with display pixels (for example, on the backplane of a display panel). In some embodiments, this substrate is a non-conductive substrate similar to the substrate of a circuit board such as a printed circuit board (PCB).

As described above, displays based on light-emitting diodes (LEDs) such as organic light-emitting diodes (OLEDs) and/or inorganic micro light-emitting diodes (also referred to as micro LEDs or μLEDs) may be used for applications in emerging portable electronics and wearable computers (for example, computing devices, laptop computers, mobile devices, tablets, phones, head mounted displays, head worn displays, wristwatches, wearable watch displays, Virtual Reality (VR), Augmented Reality (AR) displays, mixed reality displays, OLED displays, micro LED displays, etc).

Display and/or camera technologies have advanced tremendously. For example, some of the biggest innovations in phones and other computing devices have occurred due to advancements initiated by display and/or camera technologies. In some embodiments, display and camera technologies can be integrated.

Organic light-emitting diode (OLED) technology can be used in OLED display devices. OLED technology can be implemented in OLED displays, resulting in thin and low power displays that can be used in mobile devices. Micro light-emitting diode (micro LED or μLED) display devices can provide high efficiency with low power. In some embodiments, an LED based display (for example, a μLED based display) is implemented with integrated LED (for example, μLED) and image sensor devices (for example, Complementary Metal Oxide Semiconductor or CMOS camera image sensor devices).

According to some embodiments, employing a small sized pixel element such as a μLED (for example, 5 μm by 5 μm) in a larger display pixel (for example, 40 μm by 70 μm, 80 μm by 80 μm, 100 μm by 100 μm, etc.), can provide enough open area within the display pixel for other devices (and/or electronics) to be added within the display pixel (that is, for example, within the display pixel structure and/or on the same display pixel substrate). For example, other electronics can be added to a display pixel that co-exist with the substrate and/or address a group of pixels, etc. In some embodiments, an image sensor (for example, a camera sensor) can be added to the display pixel. In some embodiments, memory cells such as static random access memory (SRAM) memory cells or dynamic random access memory (DRAM) memory cells can be added to the display pixel. In some embodiments, sensors can be added to a display pixel (for example, sensors such as one or more image and/or camera sensors, touch sensors, pressure sensors, vibration sensors, temperature sensors, accelerometers, and/or gyroscopes, etc. can be added to a display pixel). In some embodiments, logic architecture can be added to a display pixel. Addition of devices and/or components to a display pixel may permit display functionality without the need for communication back and forth with a host (or host silicon), for example. In some embodiments, for example, panel self-refresh can be implemented without communication between a pixel and a host.

Micro LED displays use different materials (µLEDs) and processes (micro-transfer) compared with other display technologies such as liquid crystal displays (LCDs). Micro LED manufacturing can include fabrication of µLEDs on a wafer substrate (for example, in micrometer dimensions such as 5 µm by 5 µm). Some active matrix µLED display panels use GaN-based (Gallium Nitride based) or GaP-based (Gallium Phosphide based) µLEDs that emit red, green and blue colors. These µLEDs can be first fabricated on separate wafers (for example, silicon or sapphire) and then transferred from wafer to thin-film transistor (TFT) backplanes to make RGB pixels (red, green and blue pixels) that make up an active matrix µLED display panel.

In some embodiments, an image sensor (for example, a camera sensor such as a camera CMOS sensor) can be integrated into a display pixel (for example, an LED display pixel and/or a µLED display pixel). In some embodiments, an image sensor can be integrated on a same substrate with display pixels (for example, on the backplane of a display panel). In some embodiments, other sensors, memory, storage, etc. can be integrated on a same substrate with display pixels (for example, on the backplane of a display panel). In some embodiments, this substrate is a non-conductive substrate similar to the substrate of a circuit board such as a printed circuit board (PCB). In some embodiments, a micro lens can be integrated on top of one or more sensors (for example, one or more image sensors) in a display pixel (for example, an LED display pixel and/or a µLED display pixel).

In some embodiments, integration of an image sensor, camera sensor and/or camera in a display pixel can enable various usage models (for example, usage models for computing devices, laptop computers, mobile devices, tablets, phones, head mounted displays, head worn displays, wristwatches, wearable watch displays, Virtual Reality displays, Augmented Reality displays, mixed reality displays, etc.)

In some embodiments, an image sensor, camera sensor and/or camera can be integrated in one or more display pixels, which can allow a small and thin form factor of the display and/or the device in which the display is included. In some embodiments, an image sensor, camera sensor and/or camera can be integrated in one or more display pixels, which can mitigate against eye gaze mismatch since display and camera sensor locations are almost exactly the same. In some embodiments, triangular depth sensing can be used. In some embodiments, depth measurement range can be determined by camera distance. In some embodiments, camera distance can be dynamically adjustable based on target depth.

In some embodiments, one or more image sensors can be distributed within one or more (or all) pixels in a display. This can help provide a situation where the image sensors can capture an image of a person where the person is looking directly into one or more of the image sensors rather than exhibiting a gaze mismatch where a user is looking at the display, but the camera is at a slightly different location than the display. This can also provide space for a camera in small devices that include a display such as, for example small wearable devices such as smart watches, etc., where device real estate is constrained due to the small size of the device. In some embodiments, it is not necessary to assign a camera space that is external to the display. In some embodiments, camera like functions can be integrated into the display pixels and still generate an enhanced image (for example, using many image sensors distributed within many or all pixels of a display array of pixels).

Some embodiments relate to flat panel light-emitting diode (LED) displays in which an array of LEDs are used as pixels in a video display. Some embodiments relate to micro light-emitting diode (micro LED or µLED) displays in which an array of µLEDs are used as pixels in a video display. Although LED displays with an array of LEDs such as organic LEDs (OLEDs), µLEDs, etc. are described herein, some embodiments relate to display with an array of other types of light emitting devices other than LEDs, OLEDs or µLEDs.

FIG. 1 illustrates a structure of a display pixel 100. In some embodiments, display pixel structure 100 can be included in any device with a display. In some embodiments, display pixel 100 includes a substrate 101. A number of devices can be included on the substrate 101 (and/or can be integrated on the substrate 101). For example, in some embodiments, LED 102, LED 104, image sensor 106, sensor 108, sensor 112, memory 114, micro lens 116 and/or infrared (IR) sensor 118 can be integrated on (and/or included on) substrate 101. In some embodiments, substrate 101 can be a part of a backplane of a display panel. In some embodiments, substrate 101 is a non-conductive substrate similar to the substrate of a circuit board such as a printed circuit board (PCB).

Display pixel 100 includes a light-emitting diode (LED) 102, and an LED 104. In some embodiments, one or more of LED 102 and/or LED 104 are µLEDs. Although display pixel 100 is illustrated as having two LEDs 102 and 104, it is noted that in some embodiments any number of LEDs may be included in the display pixel. In some embodiments, more than one LED are included for redundancy purposes in case an LED is not working properly, for example. Display pixel 100 also includes an image sensor 106. In some embodiments, for example, image sensor 106 is a camera sensor and/or a complementary metal oxide semiconductor (CMOS) camera sensor. In some embodiments, additional sensors 108 and 112 may be included in the display pixel 100. Sensors 108 and/or 112 can include, for example, one or more touch sensors, one or more pressure sensors, one or more vibration sensors, one or more temperature sensors, one or more accelerometers, one or more gyroscopes, one or more infrared (IR) sensor, one or more infrared LED, and/or one or more ambient light sensors (ALS), etc. In some embodiments, memory 114 (and/or storage) is included in the display pixel 100. For example, memory 114 might include one or more memory devices, one or more memory cells, one or more storage devices, one or more solid state storage devices, one or more random access memory (RAM) devices, one or more RAM cells, one or more static random access memory (SRAM) devices, one or more SRAM cells, one or more dynamic random access memory (DRAM) devices, and/or one or more DRAM cells. In some embodiments, the memory and/or storage 114 can store data relating to the display pixel 100. For example, in some embodiments, the memory and/or storage 114 can store data relating to the display pixel 100 for future use by the display pixel 100 and/or by another display pixel (for example, it can store data sent from another source such as a host computer or a display controller to the display pixel 100). In some embodiments, the memory and/or storage 114 can store data relating to one or more of the sensors in display pixel 100, and/or can store data relating to one or more sensors from another display pixel. For example, in some embodiments, memory and/or storage 114 can store image data captured by image sensor 106, and/or by one or more image sensors from another display pixel.

In some embodiments, a micro lens can be integrated on top of one or more sensors (for example, one or more image sensors) in a display pixel. In some embodiments, a micro lens 116 can be integrated on top of image sensor 106.

In some embodiments, display pixel 100 includes an infrared (IR) sensor 118. In some embodiments, IR sensor 118 can be a gray scale sensor to enable infrared sensing. For example, IR sensor 118 can be an IR LED in some embodiments. In some embodiments, IR sensor 118 can be used to help enable depth sensing.

In some embodiments, given a small size of a μLED (for example, 5 μm by 5 μm) in a larger display pixel 100 (for example, 100 μm by 100 μm, 80 μm by 80 μm, 40 μm by 70 μm, 30 μm by 90 μm, etc.), there is enough open area (and/or real estate) for other electronics within the display pixel (for example, memory cells, sensors, etc.) For example, in some embodiments, logic architecture is included in display pixel 100, and/or logic architecture co-exists on the substrate 101 of the display pixel 100. In some embodiments, display functionality and/or other functionality can occur within the display pixel 100 and/or within a display panel that includes display pixel 100 without any need for communication back and forth with a host (for example, panel self-refresh may be performed in some embodiments without any communication with a host).

In some embodiments, display pixel 100 is included on a wafer substrate (for example, on substrate 101) that is approximately 40 μm by 70 μm. In some embodiments, LED 102 and/or LED 104 are approximately 5 μm by 5 μm. In some embodiments, image sensor 106 is approximately 20 μm by 20 μm. In some embodiments, sensor 108 and/or sensor 112 are approximately 10 μm by 10 μm. In some embodiments, memory 114 is approximately 15 μm by 50 μm. In some embodiments, IR sensor 118 is approximately 5 μm by 5 μm.

In some embodiments, display pixel 100 is included on a wafer substrate (for example, on substrate 101) that is approximately 30 μm by 90 μm. In some embodiments, LED 102 and/or LED 104 are approximately 5 μm by 51 μm. In some embodiments, image sensor 106 is approximately 20 μm by 20 μm. In some embodiments, sensor 108 and/or sensor 112 are approximately 10 μm by 10 μm. In some embodiments, memory 114 is approximately 20 μm by 35 μm. In some embodiments, IR sensor 118 is approximately 5 μm by 5 μm.

In some embodiments, display pixel 100 is manufactured using micro-transfer process and/or micro-transfer processes. In some embodiments, LEDs 102 and/or 104 are fabricated on a wafer substrate such as substrate 101 (for example, in micrometer dimensions such as, for example, 5 μm by 5 μm). In some embodiments, LEDs 102 and/or 104 are included in an active matrix μLED display panel. In some embodiments, LEDs 102 and/or 104 are GaN-based or GaP-based μLEDs. In some embodiments, LEDs 102 and/or 104 are red, green, or blue colors. In some embodiments, active matrix μLED display panels use GaN-based or GaP-based μLEDs (including, for example, LEDs 102 and/or 104) that emit red, green, and/or blue colors. In some embodiments, LEDs 102 and/or 104 (and/or an active matrix LED display panel including LEDs 102 and/or 104) are first fabricated on separate wafers (for example, silicon or sapphire), and are then transferred from wafers to thin-film transistor (TFT) backplanes. In some embodiments, LEDs 102 and/or 104 are first fabricated on separate wafers (for example, silicon or sapphire), and are then transferred from wafers to thin-film transistor (TFT) backplanes to make pixels such as display pixel 100 (for example, RGB pixels) that are included in an active matrix μLED display panel.

Figure 2:
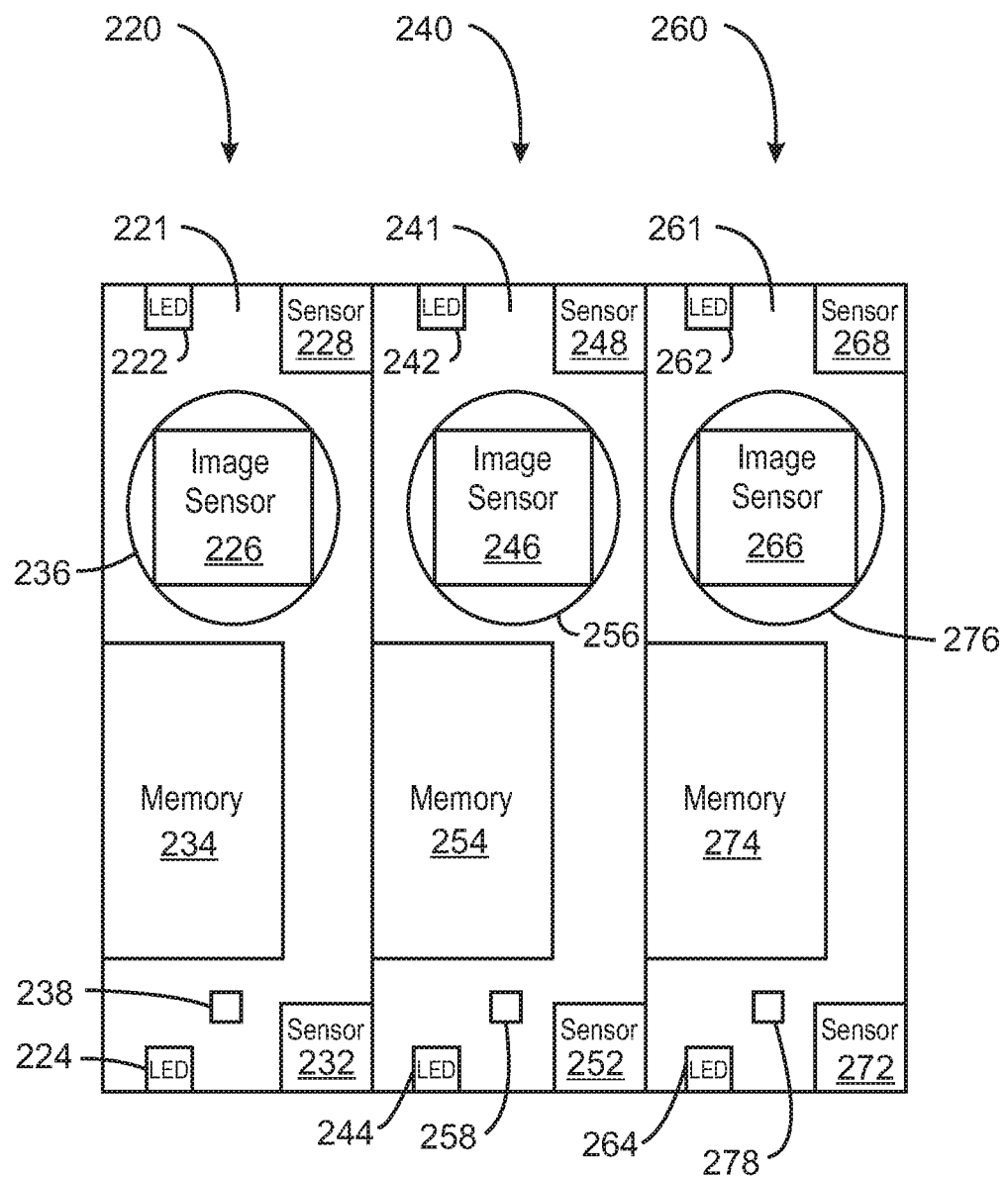
FIG. 2 illustrates a group of display pixels.

FIG. 2 illustrates a structure of a group 200 of display pixels 220, 240 and 260 (for example display pixel structure 220, display pixel structure 240, and display pixel structure 260). In some embodiments, display pixel group 200 can be included in any device with a display. In some embodiments, display pixel 220 includes a substrate 221. A number of devices can be included on the substrate 221. In some embodiments, display pixel 240 includes a substrate 241. A number of devices can be included on the substrate 241. In some embodiments, display pixel 260 includes a substrate 261. A number of devices can be included on the substrate 261. In some embodiments, substrates 221, 241 and 261 can be a part of a backplane of a display panel. In some embodiments, substrate 221, substrate 241, and/or substrate 261 are non-conductive substrates similar to the substrate of a circuit board such as a printed circuit board (PCB). In some embodiments, display pixel 220, display pixel 240 and/or display pixel 260 are similar to and/or the same as display pixel 100. In some embodiments, display pixels 220, 240 and 260 each include one or more LEDs that emit a different color than LEDs in the other display pixels. In some embodiments, one of the display pixels 220, 240 and 260 includes one or more LEDs that emit red, another of the display pixels 220, 240 and 260 include one or more LEDs that emit green, and a third of the display pixels 220, 240 and 260 include one or more LEDs that emit blue. In some embodiments, display pixel 220 includes one or more LEDs that emit a red color, display pixel 240 includes one or more LEDs that emit a green color, and display pixel 260 includes one or more LEDs that emit a blue color.

A number of devices can be included on the substrate 221 (and/or can be integrated on the substrate 221). For example, in some embodiments, LED 222, LED 224, image sensor 226, sensor 228, sensor 232, memory 234, micro lens 236 and/or infrared (IR) sensor 238 can be integrated on (and/or included on) substrate 221. In some embodiments, substrate 221 can be a part of a backplane of a display panel. In some embodiments, substrate 221 is a non-conductive substrate similar to the substrate of a circuit board such as a printed circuit board (PCB).

Display pixel 220 includes an LED 222 and an LED 224. In some embodiments, one or more of LED 222 and/or LED 224 are μLEDs. In some embodiments, LED 222 and LED 224 emit a red color. Display pixel 220 also includes an image sensor 226. In some embodiments, for example, image sensor 226 is a camera sensor and/or a complementary metal oxide semiconductor (CMOS) camera sensor. In some embodiments, additional sensors 228 and 232 may be included in the display pixel 220. Sensors 228 and/or 232 can include, for example, one or more touch sensors, one or more pressure sensors, one or more vibration sensors, one or more temperature sensors, one or more accelerometers, one or more gyroscopes, one or more infrared (IR) sensor, one or more infrared LED, and/or one or more ambient light sensors (ALS), etc. In some embodiments, memory 234 (in some embodiments, memory 234 is storage 234) is included in the display pixel 220. For example, memory 234 might include one or more memory devices, one or more memory cells, one or more storage devices, one or more solid state storage devices, one or more random access memory (RAM) devices, one or more RAM cells, one or more static random access memory (SRAM) devices, one or more SRAM cells, one or more dynamic random access memory (DRAM) devices, and/or one or more DRAM cells. In some embodiments, the memory and/or storage 234 can store data relating to the display pixel 220. For example, in some embodiments, the memory and/or storage 234 can store data relating to the display pixel 220 for future use by the display pixel 220 and/or by another display pixel (for example, it can store data sent from another source such as a host computer or a display controller to the display pixel 220). In some embodiments, the memory and/or storage 234 can store data relating to one or more of the sensors in display pixel 220, and/or can store data relating to one or more sensors from another display pixel such as display pixel 240 and/or display pixel 260. For example, in some embodiments, memory and/or storage 234 can store image data captured by image sensor 226, and/or one or more image sensors from another display pixel such as display pixel 240 and/or display pixel 260, for example.

In some embodiments, a micro lens can be integrated on top of one or more sensors (for example, one or more image sensors) in a display pixel. In some embodiments, a micro lens 236 can be integrated on top of image sensor 226.

In some embodiments, display pixel 220 includes an infrared (IR) sensor 238. In some embodiments, IR sensor 238 can be a gray scale sensor to enable infrared sensing. For example, IR sensor 238 can be an IR LED in some embodiments. In some embodiments, IR sensor 238 can be used to help enable depth sensing.

In some embodiments, given a small size of a µLED (for example, 5 µm by 5 µm) in a larger display pixel 100 (for example, 100 µm by 100 µm, 80 µm by 80 µm, 40 µm by 70 µm, 30 µm by 90 µm, etc.), there is enough open area (and/or real estate) for other electronics within the display pixel (for example, memory cells, sensors, etc.) For example, in some embodiments, logic architecture is included in display pixel 220, and/or logic architecture co-exists on the substrate 221 of the display pixel 220. In some embodiments, display functionality and/or other functionality can occur within the display pixel 220 and/or within a display panel that includes display pixel 220 without any need for communication back and forth with a host (for example, panel self-refresh may be performed in some embodiments without any communication with a host).

In some embodiments, display pixel 220 is included on a wafer substrate (for example, on substrate 221) that is approximately 40 µm by 70 µm. In some embodiments, LED 222 and/or LED 224 are approximately 5 µm by 5 µm. In some embodiments, image sensor 226 is approximately 20 µm by 20 µm. In some embodiments, sensor 228 and/or sensor 232 are approximately 10 µm by 10 µm. In some embodiments, memory 234 is approximately 15 µm by 50 µm. In some embodiments, IR sensor 238 is approximately 5 µm by 5 µm.

In some embodiments, display pixel 220 is included on a wafer substrate (for example, on substrate 221) that is approximately 30 µm by 90 µm. In some embodiments, LED 222 and/or LED 224 are approximately 5 µm by 5 µm. In some embodiments, image sensor 226 is approximately 20 µm by 20 µm. In some embodiments, sensor 228 and/or sensor 232 are approximately 10 µm by 10 µm. In some embodiments, memory 234 is approximately 20 µm by 35 µm. In some embodiments, IR sensor 238 is approximately 5 µm by 5 µm.

In some embodiments, display pixel 220 is manufactured using micro-transfer process and/or micro-transfer processes. In some embodiments, LEDs 222 and/or 224 are fabricated on a wafer substrate such as substrate 221 (for example, in micrometer dimensions such as, for example, 5 µm by 5 µm). In some embodiments, LEDs 222 and/or 224 are included in an active matrix µLED display panel. In some embodiments, LEDs 222 and/or 224 are GaN-based or GaP-based µLEDs. In some embodiments, LEDs 222 and/or 224 are red, green, or blue colors. In some embodiments, active matrix µLED display panels use GaN-based or GaP-based µLEDs (including, for example, LEDs 222 and/or 224) that emit red, green, and/or blue colors. In some embodiments, LEDs 222 and/or 224 (and/or an active matrix LED display panel including LEDs 222 and/or 224) are first fabricated on separate wafers (for example, silicon or sapphire), and are then transferred from wafers to thin-film transistor (TFT) backplanes. In some embodiments, LEDs 222 and/or 224 are first fabricated on separate wafers (for example, silicon or sapphire), and are then transferred from wafers to thin-film transistor (TFT) backplanes to make pixels such as display pixel 100 (for example, RGB pixels) that are included in an active matrix µLED display panel.

A number of devices can be included on the substrate 241 (and/or can be integrated on the substrate 241). For example, in some embodiments, LED 242, LED 244, image sensor 246, sensor 248, sensor 252, memory 254, micro lens 256 and/or infrared (IR) sensor 258 can be integrated on (and/or included on) substrate 241. In some embodiments, substrate 241 can be a part of a backplane of a display panel. In some embodiments, substrate 241 is a non-conductive substrate similar to the substrate of a circuit board such as a printed circuit board (PCB).

Display pixel 240 includes an LED 242 and an LED 244. In some embodiments, one or more of LED 242 and/or LED 244 are µLEDs. In some embodiments, LED 242 and LED 244 emit a green color. Display pixel 240 also includes an image sensor 246. In some embodiments, for example, image sensor 246 is a camera sensor and/or a complementary metal oxide semiconductor (CMOS) camera sensor. In some embodiments, additional sensors 248 and 252 may be included in the display pixel 240. Sensors 248 and/or 252 can include, for example, one or more touch sensors, one or more pressure sensors, one or more vibration sensors, one or more temperature sensors, one or more accelerometers, one or more gyroscopes, one or more infrared (IR) sensor, one or more infrared LED, and/or one or more ambient light sensors (ALS), etc. In some embodiments, memory 254 (in some embodiments, memory 254 is storage 254) is included in the display pixel 240. For example, memory 254 might include one or more memory devices, one or more memory cells, one or more storage devices, one or more random access memory (RAM) devices, one or more RAM cells, one or more static random access memory (SRAM) devices, one or more SRAM cells, one or more dynamic random access memory (DRAM) devices, and/or one or more DRAM cells. In some embodiments, the memory and/or storage 254 can store data relating to the display pixel 240. For example, in some embodiments, the memory and/or storage 254 can store data relating to the display pixel 240 for future use by the display pixel 240 and/or by another display pixel (for example, it can store data sent from another source such as a host computer or a display controller to the display pixel 240). In some embodiments, the memory and/or storage 254 can store data relating to one or more of the sensors in display pixel 240, and/or can store data relating to one or more sensors from another display pixel such as display pixel 220 and/or display pixel 260. For example, in some embodiments, memory and/or storage 254 can store image data captured by image sensor 246, and/or one or more image sensors from another display pixel such as display pixel 220 and/or display pixel 260, for example.

In some embodiments, a micro lens can be integrated on top of one or more sensors (for example, one or more image sensors) in a display pixel. In some embodiments, a micro lens 256 can be integrated on top of image sensor 246.

In some embodiments, display pixel 240 includes an infrared (IR) sensor 258. In some embodiments, IR sensor 258 can be a gray scale sensor to enable infrared sensing. For example, IR sensor 258 can be an IR LED in some embodiments. In some embodiments, IR sensor 258 can be used to help enable depth sensing.

In some embodiments, given a small size of a μLED (for example, 51 μm by 5 μm) in a larger display pixel 240 (for example, 100 μm by 100 μm, 801 μm by 80 μm, 40 μm by 70 μm, 30 μm by 90 μm, etc.), there is enough open area (and/or real estate) for other electronics within the display pixel (for example, memory cells, sensors, etc.) For example, in some embodiments, logic architecture is included in display pixel 240, and/or logic architecture co-exists on the substrate 241 of the display pixel 240. In some embodiments, display functionality and/or other functionality can occur within the display pixel 240 and/or within a display panel that includes display pixel 240 without any need for communication back and forth with a host (for example, panel self-refresh may be performed in some embodiments without any communication with a host).

In some embodiments, display pixel 240 is included on a wafer substrate (for example, on substrate 241) that is approximately 40 μm by 70 μm. In some embodiments, LED 242 and/or LED 244 are approximately 5 μm by 5 μm. In some embodiments, image sensor 246 is approximately 20 μm by 20 μm. In some embodiments, sensor 248 and/or sensor 252 are approximately 10 μm by 10 μm. In some embodiments, memory 254 is approximately 15 μm by 501 μm. In some embodiments, IR sensor 258 is approximately 5 μm by 5 μm.

In some embodiments, display pixel 240 is included on a wafer substrate (for example, on substrate 241) that is approximately 30 μm by 90 μm. In some embodiments, LED 242 and/or LED 244 are approximately 5 μm by 5 μm. In some embodiments, image sensor 246 is approximately 20 μm by 20 μm. In some embodiments, sensor 248 and/or sensor 252 are approximately 10 μm by 10 μm. In some embodiments, memory 254 is approximately 20 μm by 35 μm. In some embodiments, IR sensor 258 is approximately 5 μm by 5 μm.

In some embodiments, display pixel 240 is manufactured using micro-transfer process and/or micro-transfer processes. In some embodiments, LEDs 242 and/or 244 are fabricated on a wafer substrate such as substrate 241 (for example, in micrometer dimensions such as, for example, 5 μm by 5 μm). In some embodiments, LEDs 242 and/or 244 are included in an active matrix μLED display panel. In some embodiments, LEDs 242 and/or 244 are GaN-based or GaP-based μLEDs. In some embodiments, LEDs 242 and/or 244 are red, green, or blue colors. In some embodiments, active matrix μLED display panels use GaN-based or GaP-based μLEDs (including, for example, LEDs 242 and/or 244) that emit red, green, and/or blue colors. In some embodiments, LEDs 242 and/or 244 (and/or an active matrix LED display panel including LEDs 242 and/or 244) are first fabricated on separate wafers (for example, silicon or sapphire), and are then transferred from wafers to thin-film transistor (TFT) backplanes. In some embodiments, LEDs 242 and/or 244 are first fabricated on separate wafers (for example, silicon or sapphire), and are then transferred from wafers to thin-film transistor (TFT) backplanes to make pixels such as display pixel 100 (for example, RGB pixels) that are included in an active matrix μLED display panel.

A number of devices can be included on the substrate 261 (and/or can be integrated on the substrate 261). For example, in some embodiments, LED 262, LED 264, image sensor 266, sensor 268, sensor 272, memory 274, micro lens 276 and/or infrared (IR) sensor 278 can be integrated on (and/or included on) substrate 261. In some embodiments, substrate 261 can be a part of a backplane of a display panel. In some embodiments, substrate 261 is a non-conductive substrate similar to the substrate of a circuit board such as a printed circuit board (PCB).

Display pixel 260 includes an LED 262 and an LED 264. In some embodiments, one or more of LED 262 and/or LED 264 are μLEDs. In some embodiments, LED 262 and LED 264 emit a green color. Display pixel 260 also includes an image sensor 266. In some embodiments, for example, image sensor 266 is a camera sensor and/or a complementary metal oxide semiconductor (CMOS) camera sensor. In some embodiments, additional sensors 268 and 272 may be included in the display pixel 260. Sensors 268 and/or 272 can include, for example, one or more touch sensors, one or more pressure sensors, one or more vibration sensors, one or more temperature sensors, one or more accelerometers, one or more gyroscopes, one or more infrared (IR) sensor, one or more infrared LED, and/or one or more ambient light sensors (ALS) sensors, etc. In some embodiments, memory 274 (in some embodiments, memory 274 is storage 274) is included in the display pixel 260. For example, memory 274 might include one or more memory devices, one or more memory cells, one or more storage devices, one or more random access memory (RAM) devices, one or more RAM cells, one or more static random access memory (SRAM) devices, one or more SRAM cells, one or more dynamic random access memory (DRAM) devices, and/or one or more DRAM cells. In some embodiments, the memory and/or storage 274 can store data relating to the display pixel 260. For example, in some embodiments, the memory and/or storage 274 can store data relating to the display pixel 260 for future use by the display pixel 260 and/or by another display pixel (for example, it can store data sent from another source such as a host computer or a display controller to the display pixel 260). In some embodiments, the memory and/or storage 274 can store data relating to one or more of the sensors in display pixel 260, and/or can store data relating to one or more sensors from another display pixel such as display pixel 220 and/or display pixel 240. For example, in some embodiments, memory and/or storage 274 can store image data captured by image sensor 266, and/or one or more image sensors from another display pixel such as display pixel 220 and/or display pixel 240, for example.

In some embodiments, a micro lens can be integrated on top of one or more sensors (for example, one or more image sensors) in a display pixel. In some embodiments, a micro lens 276 can be integrated on top of image sensor 266.

In some embodiments, display pixel 260 includes an infrared (IR) sensor 278. In some embodiments, IR sensor 278 can be a gray scale sensor to enable infrared sensing. For example, IR sensor 278 can be an IR LED in some embodiments. In some embodiments, IR sensor 278 can be used to help enable depth sensing.

In some embodiments, given a small size of a μLED (for example, 5 μm by 5 μm) in a larger display pixel 260 (for example, 100 μm by 100 μm, 80 μm by 80 μm, 40 μm by 70 μm, 30 μm by 90 μm, etc.), there is enough open area (and/or real estate) for other electronics within the display pixel (for example, memory cells, sensors, etc.) For example, in some embodiments, logic architecture is included in display pixel 260, and/or logic architecture co-exists on the substrate 261 of the display pixel 260. In some embodiments, display functionality and/or other functionality can occur within the display pixel 260 and/or within a display panel that includes display pixel 260 without any need for communication back and forth with a host (for example, panel self-refresh may be performed in some embodiments without any communication with a host).

In some embodiments, display pixel 260 is included on a wafer substrate (for example, on substrate 261) that is approximately 40 μm by 70 μm. In some embodiments, LED 262 and/or LED 264 are approximately 5 μm by 5 μm. In some embodiments, image sensor 266 is approximately 20 μm by 20 μm. In some embodiments, sensor 268 and/or sensor 272 are approximately 10 μm by 10 μm. In some embodiments, memory 274 is approximately 15 μm by 50 μm. In some embodiments, IR sensor 278 is approximately 5 μm by 5 μm.

In some embodiments, display pixel 260 is included on a wafer substrate (for example, on substrate 261) that is approximately 30 μm by 90 μm. In some embodiments, LED 262 and/or LED 264 are approximately 5 μm by 5 μm. In some embodiments, image sensor 266 is approximately 20 μm by 20 μm. In some embodiments, sensor 268 and/or sensor 272 are approximately 10 μm by 10 μm. In some embodiments, memory 274 is approximately 20 μm by 35 μm. In some embodiments, IR sensor 278 is approximately 5 μm by 5 μm.

In some embodiments, display pixel 260 is manufactured using micro-transfer process and/or micro-transfer processes. In some embodiments, LEDs 262 and/or 264 are fabricated on a wafer substrate such as substrate 261 (for example, in micrometer dimensions such as, for example, 5 μm by 5 μm). In some embodiments, LEDs 262 and/or 264 are included in an active matrix μLED display panel. In some embodiments, LEDs 262 and/or 264 are GaN-based or GaP-based μLEDs. In some embodiments, LEDs 262 and/or 264 are red, green, or blue colors. In some embodiments, active matrix μLED display panels use GaN-based or GaP-based μLEDs (including, for example, LEDs 262 and/or 264) that emit red, green, and/or blue colors. In some embodiments, LEDs 262 and/or 264 (and/or an active matrix LED display panel including LEDs 262 and/or 264) are first fabricated on separate wafers (for example, silicon or sapphire), and are then transferred from wafers to thin-film transistor (TFT) backplanes. In some embodiments, LEDs 262 and/or 264 are first fabricated on separate wafers (for example, silicon or sapphire), and are then transferred from wafers to thin-film transistor (TFT) backplanes to make pixels such as display pixel 100 (for example, RGB pixels) that are included in an active matrix μLED display panel.

In some embodiments, pixel group 200 is referred to as a display pixel including three sub-pixels 220, 240 and 260. In some embodiments, display pixel 200 is 90 μm by 90 μm. In some embodiments, this can be referred to as a 282 pixel per inch (PPI) implementation, since 90 μm times 282 is roughly equal to one inch.

Figure 3:
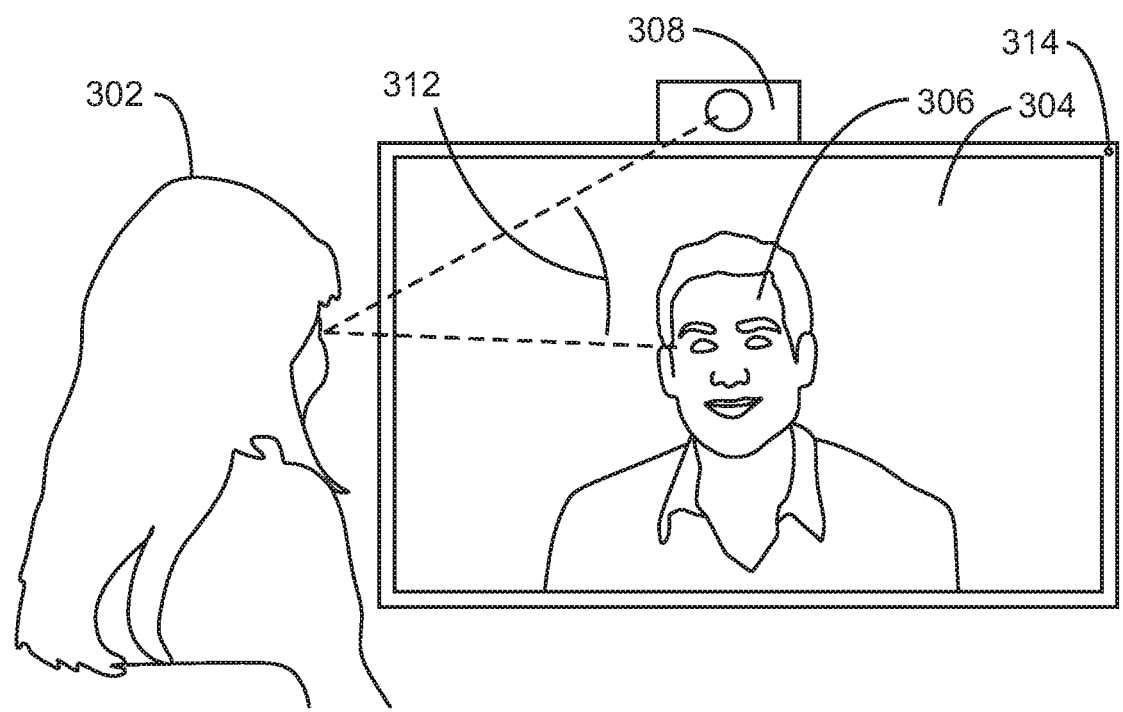
FIG. 3 illustrates a user viewing a display.

FIG. 3 illustrates an environment 300 in which a user 302 is viewing a display 304. Display 304 displays an image 306 (for example, of a person). Display 304 additionally includes an attached camera 308. When the user 302 views the image 306 on display 304, it is natural for the eyes of user 302 to be looking (and/or gazing) at the image 306 (for example, looking or gazing at the eyes of the person in the image 306). It is not natural for the user 302 to be looking or gazing at the camera 308. FIG. 3 illustrates a gaze angle 312 between a dotted line of an actual gaze of user 302 from the user toward the eyes of the person in image 306 and another dotted line from a lens of camera 308 to the eyes of the user 302, for example. In some embodiments, display 304 includes an infrared (IR) illuminator 314. In some embodiments, IR illuminator 314 can enable depth sensing.

In some embodiments, display 304 includes display pixels with image sensors and/or IR sensors integrated with LEDs in the display pixels. In some embodiments, for example, display 304 can include one or more display pixels as illustrated and/or described herein. For example, in some embodiments, one or more display pixels included in display 304 can be display pixel 100, display pixel 220, display pixel 240, display pixel 260, display pixel 520, display pixel 540, display pixel 560, display pixel 920, display pixel 940, and/or display pixel 960 illustrated and described herein.

In many scenarios, it is advantageous for a user such as user 302 to be looking into a camera such as camera 308, but it is natural for a user such as user 302 to look at an image such as image 306 on a display such as display 304. In particular, it is natural for a user such as user 302 to look into the eyes of the person in the image 306 rather than into camera 308. However, in some embodiments, a camera at a display pixel near one or more of the eyes of the person in the image 306 can be used in some embodiments. For example, in depth sensing according to some embodiments, a depth measurement range is determined by camera distance. In some embodiments, camera distance can be dynamically adjustable based upon target depth. In some embodiments, triangular depth sensing can be implemented using a camera within a display pixel located at or near a location of the eyes of the person in the image 306 and/or another camera (for example, camera 308 and/or another camera located in another display pixel of the display 304). In some embodiments, IR illuminator 314 can be used along with, for example, a camera such as an image sensor (and/or camera) and/or an IR sensor (and/or IR LED) to implement depth sensing. In some embodiments, IR illuminator 314 can be used along with, for example, a camera such as an image sensor (and/or camera) within one or more display pixel of display 304 and/or an IR sensor (and/or IR LED) within one or more display pixel of display 304 to implement depth sensing.

Figure 4:
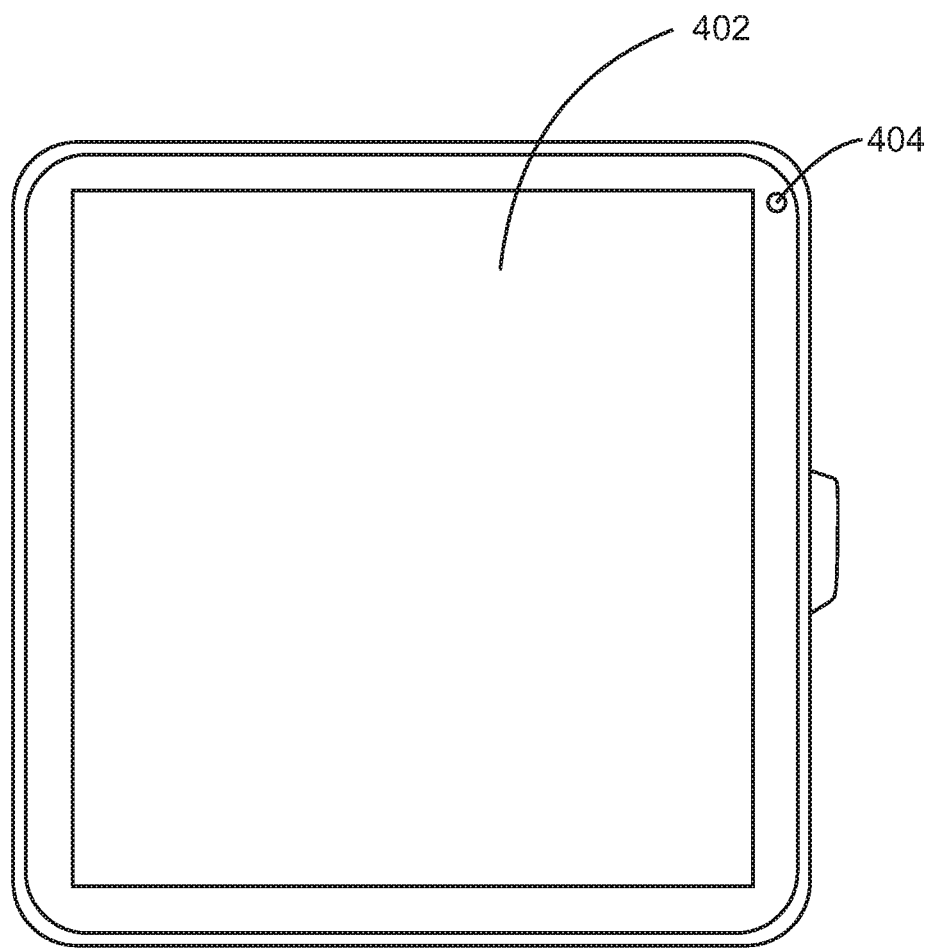
FIG. 4 illustrates a device with a display.

FIG. 4 illustrates a device 400. In some embodiments, device 400 is an electronic device. In some embodiments, device 400 is a computing device. In some embodiments, device 400 is a mobile device. In some embodiments, device 400 is a wearable device. In some embodiments, device 400 is a watch. In some embodiments, device 400 is a watch that includes computing capabilities. In some embodiments, device 400 includes a display 402. In some embodiments, device 400 can be any device with a display. In some embodiments, device 400 includes an IR illuminator 404. In some embodiments, IR illuminator 404 can enable depth sensing.

In some embodiments, display 402 includes display pixels with image sensors and/or IR sensors integrated with LEDs in the display pixels. In some embodiments, for example, display 402 includes one or more display pixels as illustrated and/or described herein. For example, in some embodiments, one or more display pixels included in display 402 can be any display pixel illustrated and/or described herein. For example, in some embodiments, one or more display pixels included in display 402 can be display pixel 100, display pixel 220, display pixel 240, display pixel 260, display pixel 520, display pixel 540, display pixel 560, display pixel 920, display pixel 940, and/or display pixel 960 illustrated and described herein.

In some embodiments, display 402 is approximately 32 mm by 32 mm, with 400 by 400 pixels (each pixel having three sub-pixels each). In some embodiments, each pixel (of three sub-pixels each) is 80 μm by 80 μm. In some embodiments, this can be implemented in a size of display 402 of approximately 1.26 inch by 1.26 inch, and referred to as 317.5 pixels per inch (PPI).

Figure 5:
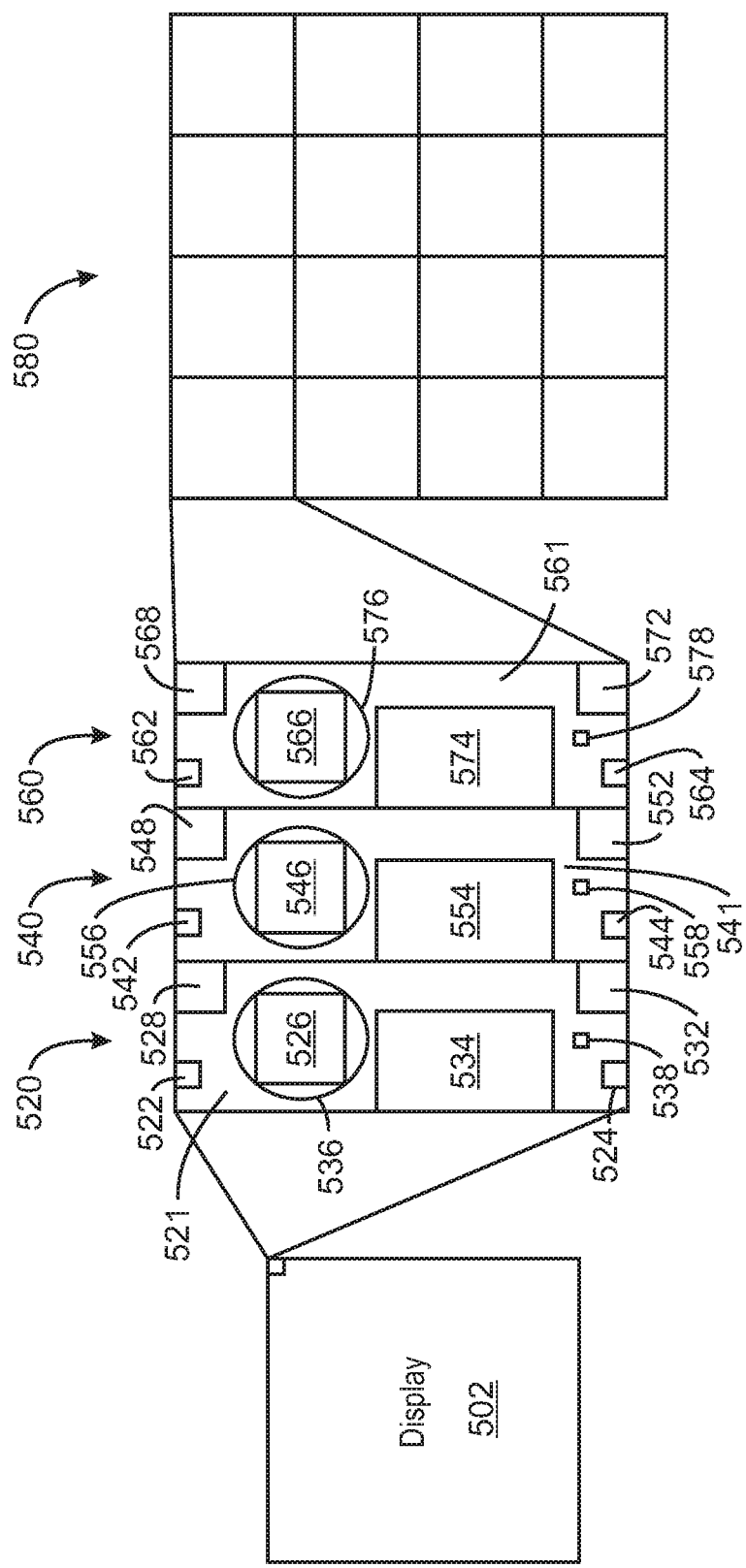
FIG. 5 illustrates a display including a group of display pixels.

FIG. 5 illustrates a display pixel structure 500 according to some embodiments. In some embodiments, display pixel structure 500 is included in a computing device. In some embodiments, display pixel structure 500 is included in a mobile device. In some embodiments, display pixel structure 500 is included in a wearable device. In some embodiments, display pixel structure 500 is included in a watch. In some embodiments, display pixel structure 500 is included in a watch. In some embodiments, display pixel structure 500 can be included in any device with a display.

In some embodiments, display pixel structure 500 includes a display 502. In some embodiments, display 502 includes display pixels with image sensors and/or IR sensors integrated with LEDs in the display pixels. In some embodiments, for example, display 502 includes one or more display pixels as illustrated and/or described herein. For example, in some embodiments, one or more display pixels included in display 502 can be any display pixel illustrated and/or described herein.

In some embodiments, display 502 includes a plurality of display pixel groups. One exemplary display pixel group of display 502 according to some embodiments is illustrated in FIG. 5. In some embodiments, an exemplary display pixel group of display 502 can include pixel 520, pixel 540 and pixel 560 (for example, display pixel structure 520, display pixel structure 540 and display pixel structure 560).

In some embodiments, display pixel 520, display pixel 540 and/or display pixel 560 are similar to and/or the same as display pixel 100. In some embodiments, display pixel 520, display pixel 540 and/or display pixel 560 are similar to and/or the same as display pixel 220, display pixel 240 and/or display pixel 260. In some embodiments, display pixels 520, 540 and 560 each include one or more LEDs that emit a different color than LEDs in the other display pixels. In some embodiments, one of the display pixels 520, 540 and 560 includes one or more LEDs that emit red, another of the display pixels 520, 540 and 560 include one or more LEDs that emit green, and a third of the display pixels 520, 540 and 560 include one or more LEDs that emit blue. In some embodiments, display pixel 520 includes one or more LEDs that emit a red color, display pixel 540 includes one or more LEDs that emit a green color, and display pixel 560 includes one or more LEDs that emit a blue color.

FIG. 5 illustrates a structure of a group display pixels 520, 540 and 560 (for example display pixel structure 520, display pixel structure 540, and display pixel structure 560). In some embodiments, the display pixel group including display pixels 520, 540 and 560 can be included in any device with a display. In some embodiments, display pixel 520 includes a substrate 521. A number of devices can be included on the substrate 521. In some embodiments, display pixel 540 includes a substrate 541. A number of devices can be included on the substrate 541. In some embodiments, display pixel 560 includes a substrate 561. A number of devices can be included on the substrate 561. In some embodiments, substrates 521, 541 and 561 can be a part of a backplane of a display panel. In some embodiments, substrate 521, substrate 541, and/or substrate 561 are non-conductive substrates similar to the substrate of a circuit board such as a printed circuit board (PCB).

A number of devices can be included on the substrate 521 (and/or can be integrated on the substrate 521). For example, in some embodiments, LED 522, LED 524, image sensor 526, sensor 528, sensor 532, memory 534, micro lens 536 and/or infrared (IR) sensor 538 can be integrated on (and/or included on) substrate 521. In some embodiments, substrate 521 can be a part of a backplane of a display panel. In some embodiments, substrate 521 is a non-conductive substrate similar to the substrate of a circuit board such as a printed circuit board (PCB).

Display pixel 520 includes an LED 522 and an LED 524. In some embodiments, one or more of LED 522 and/or LED 524 are μLEDs. In some embodiments, LED 522 and LED 524 emit a red color. Display pixel 520 also includes an image sensor 526. In some embodiments, for example, image sensor 526 is a camera sensor and/or a complementary metal oxide semiconductor (CMOS) camera sensor. In some embodiments, additional sensors 528 and 532 may be included in the display pixel 520. Sensors 528 and/or 532 can include, for example, one or more touch sensors, one or more pressure sensors, one or more accelerometers, one or more gyroscopes, one or more infrared (IR) sensor, one or more infrared LED, and/or one or more ambient light sensors (ALS), etc. In some embodiments, memory 534 (in some embodiments, memory 534 is storage 534) is included in the display pixel 520. For example, memory 534 might include one or more memory devices, one or more memory cells, one or more storage devices, one or more random access memory (RAM) devices, one or more RAM cells, one or more static random access memory (SRAM) devices, one or more SRAM cells, one or more dynamic random access memory (DRAM) devices, and/or one or more DRAM cells. In some embodiments, the memory and/or storage 534 can store data relating to the display pixel 520. For example, in some embodiments, the memory and/or storage 534 can store data relating to the display pixel 520 for future use by the display pixel 520 and/or by another display pixel (for example, it can store data sent from another source such as a host computer or a display controller to the display pixel 520). In some embodiments, the memory and/or storage 534 can store data relating to one or more of the sensors in display pixel 520, and/or can store data relating to one or more sensors from another display pixel such as display pixel 540 and/or display pixel 560. For example, in some embodiments, memory and/or storage 534 can store image data captured by image sensor 526, and/or one or more image sensors from another display pixel such as display pixel 540 and/or display pixel 560, for example.

In some embodiments, a micro lens can be integrated on top of one or more sensors (for example, one or more image sensors) in a display pixel. In some embodiments, a micro lens 536 can be integrated on top of image sensor 526.

In some embodiments, display pixel 520 includes an infrared (IR) sensor 538. In some embodiments, IR sensor 538 can be a gray scale sensor to enable infrared sensing. For example, IR sensor 538 can be an IR LED in some embodiments. In some embodiments, IR sensor 538 can be used to help enable depth sensing.

A number of devices can be included on the substrate 541 (and/or can be integrated on the substrate 541). For example, in some embodiments, LED 542, LED 544, image sensor 546, sensor 548, sensor 552, memory 554, micro lens 556 and/or infrared (IR) sensor 558 can be integrated on (and/or included on) substrate 541. In some embodiments, substrate 541 can be a part of a backplane of a display panel. In some embodiments, substrate 541 is a non-conductive substrate similar to the substrate of a circuit board such as a printed circuit board (PCB).

Display pixel 540 includes an LED 542 and an LED 544. In some embodiments, one or more of LED 542 and/or LED 544 are μLEDs. In some embodiments, LED 542 and LED 544 emit a green color. Display pixel 540 also includes an image sensor 546. In some embodiments, for example, image sensor 546 is a camera sensor and/or a complementary metal oxide semiconductor (CMOS) camera sensor. In some embodiments, additional sensors 548 and 552 may be included in the display pixel 540. Sensors 548 and/or 552 can include, for example, one or more touch sensors, one or more pressure sensors, one or more vibration sensors, one or more temperature sensors, one or more accelerometers, one or more gyroscopes, one or more infrared (IR) sensor, one or more infrared LED, and/or one or more ambient light sensors (ALS), etc. In some embodiments, memory 554 (in some embodiments, memory 554 is storage 554) is included in the display pixel 540. For example, memory 554 might include one or more memory devices, one or more memory cells, one or more storage devices, one or more random access memory (RAM) devices, one or more RAM cells, one or more static random access memory (SRAM) devices, one or more SRAM cells, one or more dynamic random access memory (DRAM) devices, and/or one or more DRAM cells. In some embodiments, the memory and/or storage 554 can store data relating to the display pixel 540. For example, in some embodiments, the memory and/or storage 554 can store data relating to the display pixel 540 for future use by the display pixel 540 and/or by another display pixel (for example, it can store data sent from another source such as a host computer or a display controller to the display pixel 540). In some embodiments, the memory and/or storage 554 can store data relating to one or more of the sensors in display pixel 540, and/or can store data relating to one or more sensors from another display pixel such as display pixel 520 and/or display pixel 260. For example, in some embodiments, memory and/or storage 554 can store image data captured by image sensor 546, and/or one or more image sensors from another display pixel such as display pixel 520 and/or display pixel 560, for example.

In some embodiments, a micro lens can be integrated on top of one or more sensors (for example, one or more image sensors) in a display pixel. In some embodiments, a micro lens 556 can be integrated on top of image sensor 546.

In some embodiments, display pixel 540 includes an infrared (IR) sensor 558. In some embodiments, IR sensor 558 can be a gray scale sensor to enable infrared sensing. For example, IR sensor 558 can be an IR LED in some embodiments. In some embodiments, IR sensor 558 can be used to help enable depth sensing.

A number of devices can be included on the substrate 561 (and/or can be integrated on the substrate 561). For example, in some embodiments, LED 562, LED 564, image sensor 566, sensor 568, sensor 572, memory 574, micro lens 576 and/or infrared (IR) sensor 578 can be integrated on (and/or included on) substrate 561. In some embodiments, substrate 561 can be a part of a backplane of a display panel. In some embodiments, substrate 561 is a non-conductive substrate similar to the substrate of a circuit board such as a printed circuit board (PCB).

Display pixel 560 includes an LED 562 and an LED 564. In some embodiments, one or more of LED 562 and/or LED 564 are μLEDs. In some embodiments, LED 562 and LED 564 emit a blue color. Display pixel 560 also includes an image sensor 566. In some embodiments, for example, image sensor 566 is a camera sensor and/or a complementary metal oxide semiconductor (CMOS) camera sensor. In some embodiments, additional sensors 568 and 572 may be included in the display pixel 560. Sensors 568 and/or 572 can include, for example, one or more touch sensors, one or more pressure sensors, one or more vibration sensors, one or more temperature sensors, one or more accelerometers, one or more gyroscopes, one or more infrared (IR) sensor, one or more infrared LED, and/or one or more ambient light sensors (ALS), etc. In some embodiments, memory 574 (in some embodiments, memory 574 is storage 574) is included in the display pixel 560. For example, memory 574 might include one or more memory devices, one or more memory cells, one or more storage devices, one or more random access memory (RAM) devices, one or more RAM cells, one or more static random access memory (SRAM) devices, one or more SRAM cells, one or more dynamic random access memory (DRAM) devices, and/or one or more DRAM cells. In some embodiments, the memory and/or storage 574 can store data relating to the display pixel 560. For example, in some embodiments, the memory and/or storage 574 can store data relating to the display pixel 560 for future use by the display pixel 560 and/or by another display pixel (for example, it can store data sent from another source such as a host computer or a display controller to the display pixel 560). In some embodiments, the memory and/or storage 574 can store data relating to one or more of the sensors in display pixel 560, and/or can store data relating to one or more sensors from another display pixel such as display pixel 520 and/or display pixel 540. For example, in some embodiments, memory and/or storage 574 can store image data captured by image sensor 566, and/or one or more image sensors from another display pixel such as display pixel 520 and/or display pixel 540, for example.

In some embodiments, a micro lens can be integrated on top of one or more sensors (for example, one or more image sensors) in a display pixel. In some embodiments, a micro lens 576 can be integrated on top of image sensor 566.

In some embodiments, display pixel 560 includes an infrared (IR) sensor 578. In some embodiments, IR sensor 578 can be a gray scale sensor to enable infrared sensing. For example, IR sensor 578 can be an IR LED in some embodiments. In some embodiments, IR sensor 578 can be used to help enable depth sensing.

In some embodiments, a portion 580 of display 502 is illustrated. For example, display portion 580a illustrates 4 by 4 (16) of the pixel groups that includes pixels 520, 540 and 560. In some embodiments, display portion 580 includes, for example, a 48 camera light field camera array (4 rows by 4 columns of pixel groups, with 3 image sensors 526, 546 and 566 in each pixel group includes 48 image sensors).

Figure 6:
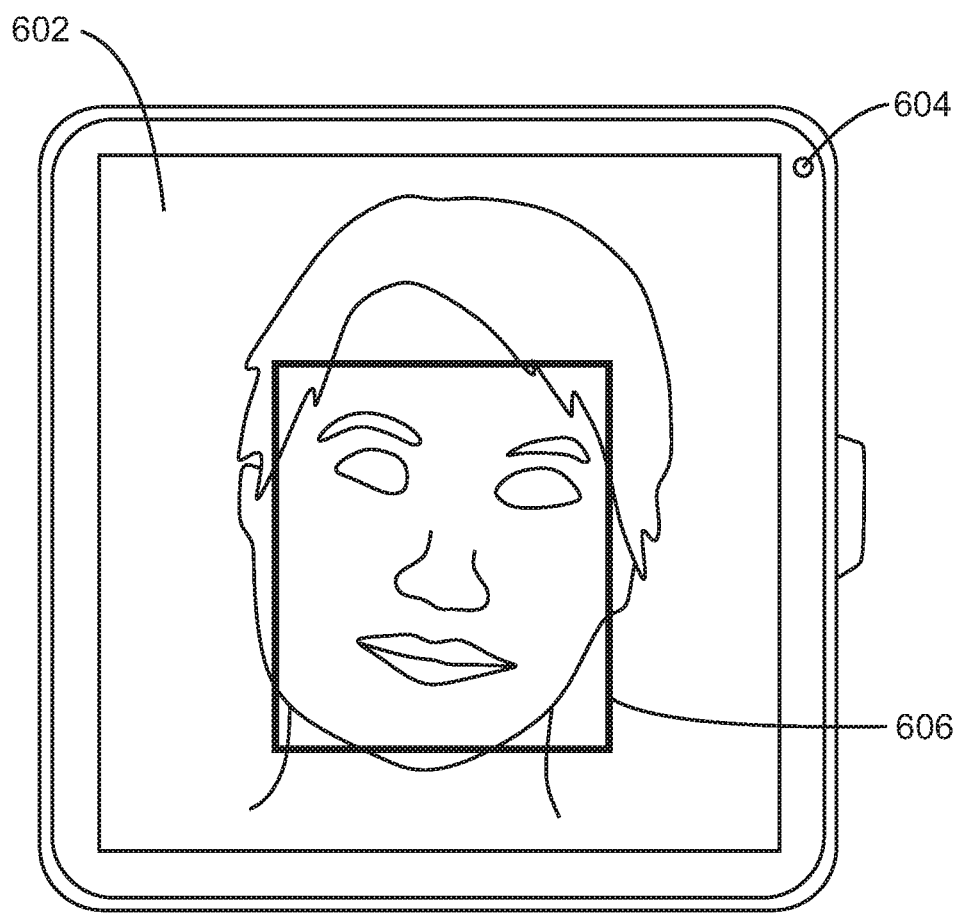
FIG. 6 illustrates a device with a display.

FIG. 6 illustrates a device 600. In some embodiments, device 600 is a computing device. In some embodiments, device 600 is a mobile device. In some embodiments, device 600 is a wearable device. In some embodiments, device 600 is a watch. In some embodiments, device 600 is a watch that includes computing capabilities. In some embodiments, device 600 is a phone and/or a phone that includes computing capabilities. In some embodiments, device 600 includes a display 602. In some embodiments, device 600 can be any device with a display.

In some embodiments, device 600 includes an IR illuminator 604. In some embodiments, IR illuminator 604 can help to enable depth sensing. In some embodiments, an image of a person is displayed on display 602. Box 606 around a face of the person displayed on display 602 is shown in FIG. 6. In some embodiments, device 600 can be used according to some embodiments. For example, IR illuminator 604, one or more image sensors included in one or more display pixels of display 602, and/or one or more IR sensors included in one or more display pixels of display 602 can implement depth sensing. A depth sensing of a person's face (for example, as included within box 606 in FIG. 6) can be used to implement facial recognition such as that included in a face login implementation according to some embodiments.

In some embodiments, display 602 includes display pixels with image sensors and/or IR sensors integrated with LEDs in the display pixels. In some embodiments, for example, display 602 includes one or more display pixels as illustrated and/or described herein. For example, in some embodiments, one or more display pixels included in display 602 can be any display pixel illustrated and/or described herein. For example, in some embodiments, one or more display pixels included in display 602 can be display pixel 100, display pixel 220, display pixel 240, display pixel 260, display pixel 520, display pixel 540, display pixel 560, display pixel 920, display pixel 940, and/or display pixel 960 illustrated and described herein.

Figure 7:
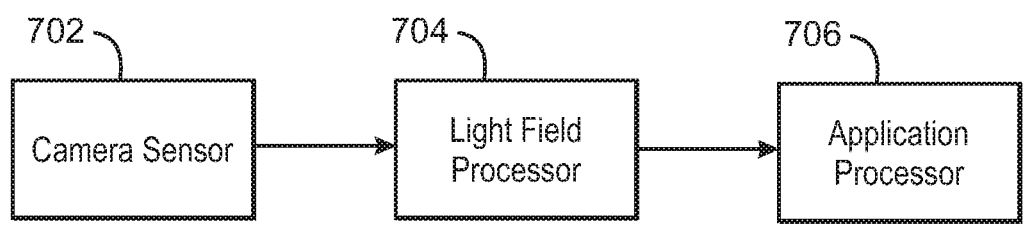
FIG. 7 illustrates image sensor array processing.

FIG. 7 illustrates a block diagram 700 of image sensor array image processing according to some embodiments. In some embodiments, image sensor array image processing device 700 can be included in any device with a display. Image sensor array image processing 700 includes one or more image sensors (for example, one or more camera sensors) 702. In some embodiments, one or more image sensors 702 can include one or more of the image sensors included within display pixels as described and/or illustrated herein. For example, in some embodiments, one or more image sensors 702 are an array of image sensors corresponding to many image sensors each included in a variety of display pixels within a display pixel array in a display. One or more image sensors 702 provide an image array output to light field processor 704, which then provides a two-dimensional picture output (for example, a two-dimensional picture output with super resolution). Application processor 706 receives the two-dimensional picture output from light field processor 704 and performs an application in response to the two-dimensional picture output. For example, in some embodiments, application processor 706 performs face detection. In some embodiments, application processor 706 performs face detection and/or face login. In some embodiments, application processor 706 performs depth sensing.

In some embodiments, one or more image sensors included within one or more display pixels and an IR illuminator such as IR illuminator 604, for example, are used to implement depth sensing, face detection and/or face login on a device such as, for example, device 600. In some embodiments, an image sensor of one or more display pixels can include a low resolution image sensor. In some embodiments, a light field processor such as processor 704 can be used in conjunction with one or more image sensors located within one or more display pixels to implement high resolution imaging (for example, equivalent to 8000×8000 resolution in some embodiments). For example, high resolution information can be generated using super resolution techniques using output from a light field camera array (for example, using light field processor 704).

Figure 8:
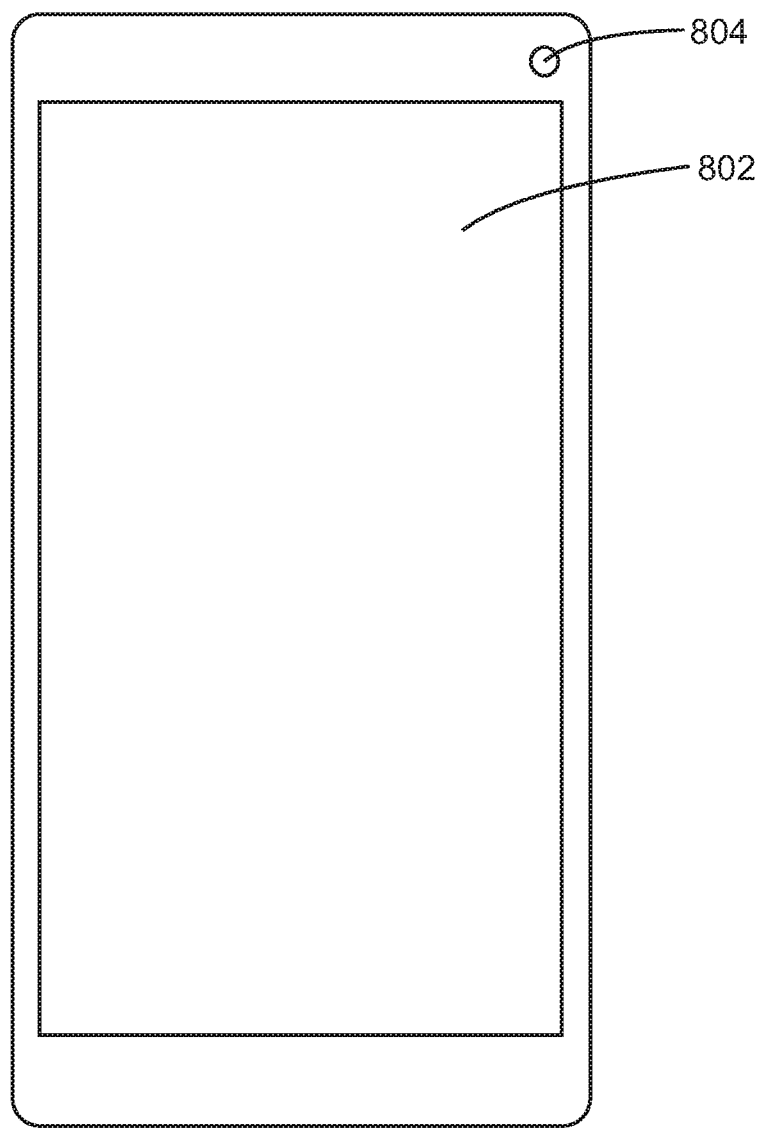
FIG. 8 illustrates a device with a display.

FIG. 8 illustrates a device 800. In some embodiments, device 800 is a computing device. In some embodiments, device 800 is a mobile device. In some embodiments, device 800 is a wearable device. In some embodiments, device 800 is a watch and/or a watch that includes computing capabilities. In some embodiments, device 800 is a phone. In some embodiments, device 800 is a phone that includes computing capabilities. In some embodiments, device 800 includes a display 802. In some embodiments, device 800 can be any device with a display. In some embodiments, device 800 includes an IR illuminator 804. In some embodiments, IR illuminator 804 can enable depth sensing.

In some embodiments, display 802 includes display pixels with image sensors and/or IR sensors integrated with LEDs in the display pixels. In some embodiments, for example, display 802 includes one or more display pixels as illustrated and/or described herein. For example, in some embodiments, one or more display pixels included in display 802 can be any display pixel illustrated and/or described herein. For example, in some embodiments, one or more display pixels included in display 802 can be display pixel 100, display pixel 220, display pixel 240, display pixel 260, display pixel 520, display pixel 540, display pixel 560, display pixel 920, display pixel 940, and/or display pixel 960 illustrated and described herein.

In some embodiments, display 802 has 1080 pixels by 1920 pixels (each pixel having three sub-pixels each). In some embodiments, each pixel (of three sub-pixels each) is 80 μm by 80 μm. In some embodiments, this can be implemented in a size of display 802 of approximately 3.4 inches by 6.05 inches, and referred to as 317.5 pixels per inch (PPI).

Figure 9:
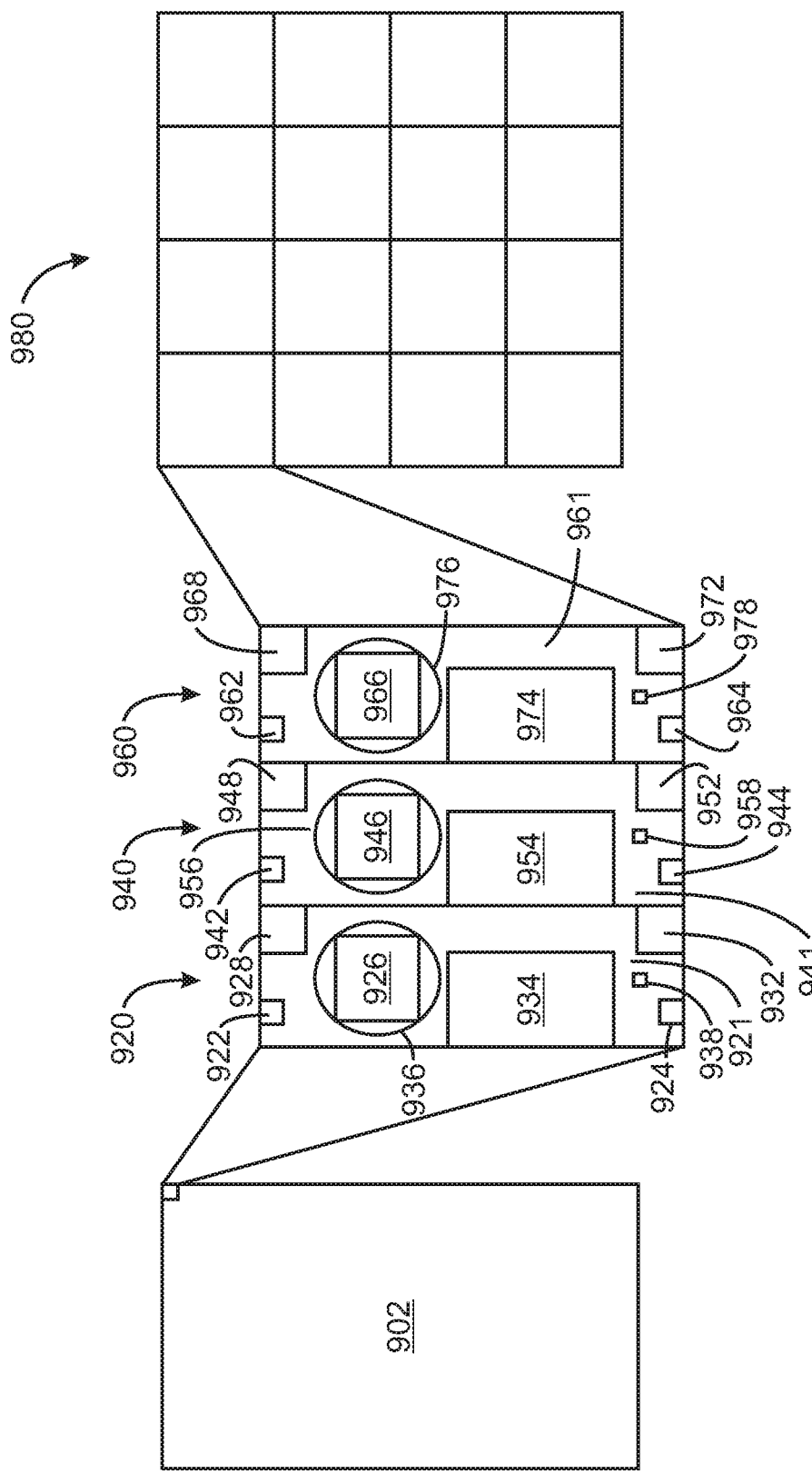
FIG. 9 illustrates a display including a group of display pixels.

FIG. 9 illustrates a display pixel structure 900 according to some embodiments. In some embodiments, display pixel structure 900 is included in a computing device. In some embodiments, display pixel structure 900 is included in a mobile device. In some embodiments, display pixel structure 900 is included in a wearable device. In some embodiments, display pixel structure 900 is included in a watch and/or a watch that includes computing capabilities. In some embodiments, display pixel structure 900 is included in a phone. In some embodiments, display pixel structure 900 is included in a phone that includes computing capabilities. In some embodiments, display pixel structure 900 can be included in any device with a display.

In some embodiments, display pixel structure 900 includes a display 902. In some embodiments, display 902 includes display pixels with image sensors and/or IR sensors integrated with LEDs in the display pixels. In some embodiments, for example, display 902 includes one or more display pixels as illustrated and/or described herein. For example, in some embodiments, one or more display pixels included in display 902 can be any display pixel illustrated and/or described herein.

In some embodiments, display 902 includes a plurality of display pixel groups. One exemplary display pixel group of display 902 according to some embodiments is illustrated in FIG. 9. In some embodiments, an exemplary display pixel group of display 902 can include pixel 920, pixel 940 and pixel 960 (for example, display pixel structure 920, display pixel structure 940 and display pixel structure 960).

In some embodiments, display pixel 920, display pixel 940 and/or display pixel 960 are similar to and/or the same as display pixel 100. In some embodiments, display pixel 920, display pixel 940 and/or display pixel 960 are similar to and/or the same as display pixel 220, display pixel 240 and/or display pixel 260. In some embodiments, display pixel 920, display pixel 940 and/or display pixel 960 are similar to and/or the same as display pixel 520, display pixel 540 and/or display pixel 560. In some embodiments, display pixels 920, 940 and 960 each include one or more LEDs that emit a different color than LEDs in the other display pixels. In some embodiments, one of the display pixels 920, 940 and 960 includes one or more LEDs that emit red, another of the display pixels 920, 940 and 960 include one or more LEDs that emit green, and a third of the display pixels 920, 940 and 960 include one or more LEDs that emit blue. In some embodiments, display pixel 920 includes one or more LEDs that emit a red color, display pixel 940 includes one or more LEDs that emit a green color, and display pixel 960 includes one or more LEDs that emit a blue color.

FIG. 9 illustrates a structure of a group of display pixels 920, 940 and 960 (for example display pixel structure 920, display pixel structure 940, and display pixel structure 960). In some embodiments, the display pixel group including display pixel 920, display pixel 940 and display pixel 960 can be included in any device with a display. In some embodiments, display pixel 920 includes a substrate 921. A number of devices can be included on the substrate 921. In some embodiments, display pixel 940 includes a substrate 941. A number of devices can be included on the substrate 941. In some embodiments, display pixel 960 includes a substrate 961. A number of devices can be included on the substrate 961. In some embodiments, substrates 921, 941 and 961 can be a part of a backplane of a display panel. In some embodiments, substrate 921, substrate 941, and/or substrate 961 are non-conductive substrates similar to the substrate of a circuit board such as a printed circuit board (PCB).

A number of devices can be included on the substrate 921 (and/or can be integrated on the substrate 921). For example, in some embodiments, LED 922, LED 924, image sensor 926, sensor 928, sensor 932, memory 934, micro lens 936 and/or infrared (IR) sensor 938 can be integrated on (and/or included on) substrate 921. In some embodiments, substrate 921 can be a part of a backplane of a display panel. In some embodiments, substrate 921 is a non-conductive substrate similar to the substrate of a circuit board such as a printed circuit board (PCB).

Display pixel 920 includes an LED 922 and an LED 924. In some embodiments, one or more of LED 922 and/or LED 924 are μLEDs. In some embodiments, LED 922 and LED 924 emit a red color. Display pixel 920 also includes an image sensor 926. In some embodiments, for example, image sensor 926 is a camera sensor and/or a complementary metal oxide semiconductor (CMOS) camera sensor. In some embodiments, additional sensors 928 and 932 may be included in the display pixel 920. Sensors 928 and/or 932 can include, for example, one or more touch sensors, one or more pressure sensors, one or more vibration sensors, one or more temperature sensors, one or more accelerometers, one or more gyroscopes, one or more infrared (IR) sensor, one or more infrared LED, and/or one or more ambient light sensors (ALS), etc. In some embodiments, memory 934 (in some embodiments, memory 934 is storage 934) is included in the display pixel 920. For example, memory 934 might include one or more memory devices, one or more memory cells, one or more storage devices, one or more random access memory (RAM) devices, one or more RAM cells, one or more static random access memory (SRAM) devices, one or more SRAM cells, one or more dynamic random access memory (DRAM) devices, and/or one or more DRAM cells. In some embodiments, the memory and/or storage 934 can store data relating to the display pixel 920. For example, in some embodiments, the memory and/or storage 934 can store data relating to the display pixel 920 for future use by the display pixel 920 and/or by another display pixel (for example, it can store data sent from another source such as a host computer or a display controller to the display pixel 920). In some embodiments, the memory and/or storage 934 can store data relating to one or more of the sensors in display pixel 920, and/or can store data relating to one or more sensors from another display pixel such as display pixel 940 and/or display pixel 960. For example, in some embodiments, memory and/or storage 934 can store image data captured by image sensor 926, and/or one or more image sensors from another display pixel such as display pixel 940 and/or display pixel 960, for example.

In some embodiments, a micro lens can be integrated on top of one or more sensors (for example, one or more image sensors) in a display pixel. In some embodiments, a micro lens 936 can be integrated on top of image sensor 926.

In some embodiments, display pixel 920 includes an infrared (IR) sensor 938. In some embodiments, IR sensor 938 can be a gray scale sensor to enable infrared sensing. For example, IR sensor 938 can be an IR LED in some embodiments. In some embodiments, IR sensor 938 can be used to help enable depth sensing.

A number of devices can be included on the substrate 941 (and/or can be integrated on the substrate 941). For example, in some embodiments, LED 942, LED 944, image sensor 946, sensor 948, sensor 952, memory 954, micro lens 956 and/or infrared (IR) sensor 958 can be integrated on (and/or included on) substrate 941. In some embodiments, substrate 941 can be a part of a backplane of a display panel. In some embodiments, substrate 941 is a non-conductive substrate similar to the substrate of a circuit board such as a printed circuit board (PCB).

Display pixel 940 includes an LED 942 and an LED 944. In some embodiments, one or more of LED 942 and/or LED 944 are μLEDs. In some embodiments, LED 942 and LED 944 emit a green color. Display pixel 940 also includes an image sensor 946. In some embodiments, for example, image sensor 946 is a camera sensor and/or a complementary metal oxide semiconductor (CMOS) camera sensor. In some embodiments, additional sensors 948 and 952 may be included in the display pixel 940. Sensors 948 and/or 952 can include, for example, one or more touch sensors, one or more pressure sensors, one or more vibration sensors, one or more temperature sensors, one or more accelerometers, one or more gyroscopes, one or more infrared (IR) sensor, one or more infrared LED, and/or one or more ambient light sensors (ALS), etc. In some embodiments, memory 954 (in some embodiments, memory 954 is storage 954) is included in the display pixel 940. For example, memory 954 might include one or more memory devices, one or more memory cells, one or more storage devices, one or more random access memory (RAM) devices, one or more RAM cells, one or more static random access memory (SRAM) devices, one or more SRAM cells, one or more dynamic random access memory (DRAM) devices, and/or one or more DRAM cells. In some embodiments, the memory and/or storage 954 can store data relating to the display pixel 940. For example, in some embodiments, the memory and/or storage 954 can store data relating to the display pixel 940 for future use by the display pixel 940 and/or by another display pixel (for example, it can store data sent from another source such as a host computer or a display controller to the display pixel 940). In some embodiments, the memory and/or storage 954 can store data relating to one or more of the sensors in display pixel 940, and/or can store data relating to one or more sensors from another display pixel such as display pixel 920 and/or display pixel 960. For example, in some embodiments, memory and/or storage 954 can store image data captured by image sensor 946, and/or one or more image sensors from another display pixel such as display pixel 920 and/or display pixel 960, for example.

In some embodiments, a micro lens can be integrated on top of one or more sensors (for example, one or more image sensors) in a display pixel. In some embodiments, a micro lens 956 can be integrated on top of image sensor 946.

In some embodiments, display pixel 940 includes an infrared (IR) sensor 958. In some embodiments, IR sensor 958 can be a gray scale sensor to enable infrared sensing. For example, IR sensor 958 can be an IR LED in some embodiments. In some embodiments, IR sensor 958 can be used to help enable depth sensing.

A number of devices can be included on the substrate 961 (and/or can be integrated on the substrate 961). For example, in some embodiments, LED 962, LED 964, image sensor 966, sensor 968, sensor 972, memory 974, micro lens 976 and/or infrared (IR) sensor 978 can be integrated on (and/or included on) substrate 961. In some embodiments, substrate 961 can be a part of a backplane of a display panel. In some embodiments, substrate 961 is a non-conductive substrate similar to the substrate of a circuit board such as a printed circuit board (PCB).

Display pixel 960 includes an LED 962 and an LED 964. In some embodiments, one or more of LED 962 and/or LED 964 are μLEDs. In some embodiments, LED 962 and LED 964 emit a blue color. Display pixel 960 also includes an image sensor 966. In some embodiments, for example, image sensor 966 is a camera sensor and/or a complementary metal oxide semiconductor (CMOS) camera sensor. In some embodiments, additional sensors 968 and 972 may be included in the display pixel 960. Sensors 968 and/or 972 can include, for example, one or more touch sensors, one or more pressure sensors, one or more vibration sensors, one or more temperature sensors, one or more accelerometers, one or more gyroscopes, one or more infrared (IR) sensor, one or more infrared LED, and/or one or more ambient light sensors (ALS), etc. In some embodiments, memory 974 (in some embodiments, memory 974 is storage 974) is included in the display pixel 960. For example, memory 974 might include one or more memory devices, one or more memory cells, one or more storage devices, one or more random access memory (RAM) devices, one or more RAM cells, one or more static random access memory (SRAM) devices, one or more SRAM cells, one or more dynamic random access memory (DRAM) devices, and/or one or more DRAM cells. In some embodiments, the memory and/or storage 974 can store data relating to the display pixel 960. For example, in some embodiments, the memory and/or storage 974 can store data relating to the display pixel 960 for future use by the display pixel 960 and/or by another display pixel (for example, it can store data sent from another source such as a host computer or a display controller to the display pixel 960). In some embodiments, the memory and/or storage 974 can store data relating to one or more of the sensors in display pixel 960, and/or can store data relating to one or more sensors from another display pixel such as display pixel 920 and/or display pixel 940. For example, in some embodiments, memory and/or storage 974 can store image data captured by image sensor 966, and/or one or more image sensors from another display pixel such as display pixel 920 and/or display pixel 940, for example.

In some embodiments, a micro lens can be integrated on top of one or more sensors (for example, one or more image sensors) in a display pixel. In some embodiments, a micro lens 976 can be integrated on top of image sensor 966.

In some embodiments, display pixel 960 includes an infrared (IR) sensor 978. In some embodiments, IR sensor 978 can be a gray scale sensor to enable infrared sensing. For example, IR sensor 978 can be an IR LED in some embodiments. In some embodiments, IR sensor 978 can be used to help enable depth sensing.

In some embodiments, a portion 980 of display 902 is illustrated. For example, display portion 980 illustrates 4 by 4 (16) of the pixel groups that includes pixels 920, 940 and 960. In some embodiments, display portion 980 includes, for example, a 48 camera light field camera array (4 rows by 4 columns of pixel groups, with 3 image sensors 926, 946 and 966 in each pixel group includes 48 image sensors).

Figure 10:
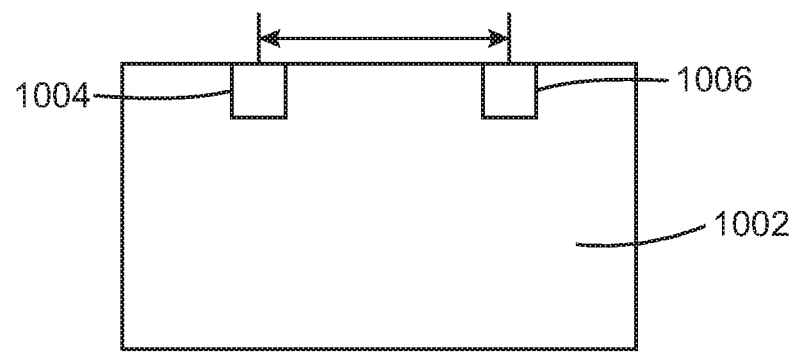
FIG. 10 illustrates a device with a display.

FIG. 10 illustrates a device 1000 according to some embodiments. In some embodiments, device 1000 is a computing device. In some embodiments, device 1000 is a mobile device. In some embodiments, device 1000 is a wearable device. In some embodiments, device 1000 is a watch and/or a watch that includes computing capabilities. In some embodiments, device 1000 is a phone. In some embodiments, device 1000 is a phone that includes computing capabilities. In some embodiments, device 1000 can be any device with a display.

In some embodiments, device 1000 includes a display 1002. In some embodiments, display 1002 includes display pixels with image sensors and/or IR sensors integrated with LEDs in the display pixels. In some embodiments, for example, display 1002 includes one or more display pixels as illustrated and/or described herein. For example, in some embodiments, one or more display pixels included in display 1002 can be any display pixel illustrated and/or described herein. For example, in some embodiments, one or more display pixels included in display 1002 can be display pixel 100, display pixel 220, display pixel 240, display pixel 260, display pixel 520, display pixel 540, display pixel 560, display pixel 920, display pixel 940, and/or display pixel 960 illustrated and described herein.

Display 1002 includes a display portion 1004 and a display portion 1006, separated by a distance illustrated by an arrow in FIG. 10. In some embodiments, the distance between display portions represented by the arrow in FIG. 10 is referred to as a camera distance. In some embodiments, display portion 1004 and/or display portion 1006 include groups of display pixels. In some embodiments, display portion 1004 and/or display portion 1006 are the same as and/or similar to display portion 580. In some embodiments, display portion 1004 and/or display portion 1006 are the same as and/or similar to display portion 980. In some embodiments, display portion 1004 and/or display portion 1006 include an array of four display groups by four display groups, where each display group includes three display pixels. In some embodiments, one or more display pixels included in display portions 1004 and/or display portion 1006 can be any display pixel illustrated and/or described herein. For example, in some embodiments, one or more display pixels included in display portion 1004 and/or display portion 1006 can be display pixel 100, display pixel 220, display pixel 240, display pixel 260, display pixel 520, display pixel 540, display pixel 560, display pixel 920, display pixel 940, and/or display pixel 960 illustrated and described herein.

In some embodiments, a distance between display portion 1004 and display portion 1006 (that is, a camera distance) is around 70 mm. In some embodiments, display portion 1004 and display portion 1006 can be used to implement depth sensing. In some embodiments, display portion 1004 and display portion 1006 can be used to implement triangular depth sensing using image sensors within one or more display pixels at display portion 1004 and image sensors within one or more display pixels at display portion 1006. In some embodiments, display portion 1004 and display portion 1006 can be used to implement depth sensing in an environment in which a distance to a subject is in a range of 0.6 meters to 2 meters. In some embodiments, display 1002 is a mobile display being held (for example, by a user) in a panoramic mode, where a width of display 1002 is longer than a height of display 1002 based on how it is currently being situated (for example, based on how it is currently being held by a user).

Figure 11:
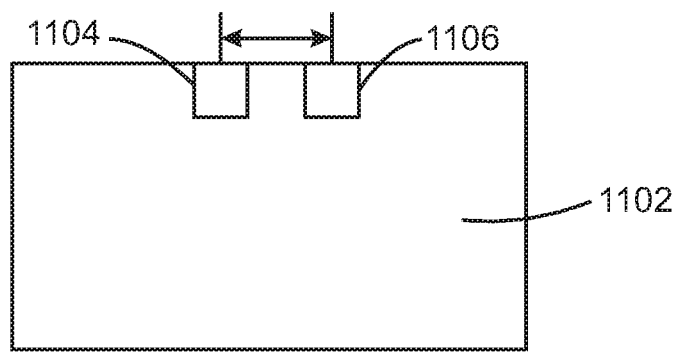
FIG. 11 illustrates a device with a display.

FIG. 11 illustrates a device 1100 according to some embodiments. In some embodiments, device 1100 is a computing device. In some embodiments, device 1100 is a mobile device. In some embodiments, device 1100 is a wearable device. In some embodiments, device 1100 is a watch and/or a watch that includes computing capabilities. In some embodiments, device 1100 is a phone. In some embodiments, device 1100 is a phone that includes computing capabilities. In some embodiments, device 1100 can be any device with a display.

In some embodiments, device 1100 includes a display 1102. In some embodiments, display 1102 includes display pixels with image sensors and/or IR sensors integrated with LEDs in the display pixels. In some embodiments, for example, display 1102 includes one or more display pixels as illustrated and/or described herein. For example, in some embodiments, one or more display pixels included in display 1102 can be any display pixel illustrated and/or described herein. For example, in some embodiments, one or more display pixels included in display 1102 can be display pixel 100, display pixel 220, display pixel 240, display pixel 260, display pixel 520, display pixel 540, display pixel 560, display pixel 920, display pixel 940, and/or display pixel 960 illustrated and described herein.

Display 1102 includes a display portion 1104 and a display portion 1106, separated by a distance illustrated by an arrow in FIG. 11. In some embodiments, the distance between display portions represented by the arrow in FIG. 11 is referred to as a camera distance. In some embodiments, display portion 1104 and/or display portion 1106 include groups of display pixels. In some embodiments, display portion 1104 and/or display portion 1106 are the same as and/or similar to display portion 580. In some embodiments, display portion 1104 and/or display portion 1106 are the same as and/or similar to display portion 980. In some embodiments, display portion 1104 and/or display portion 1106 include an array of four display groups by four display groups, where each display group includes three display pixels. In some embodiments, one or more display pixels included in display portions 1104 and/or display portion 1106 can be any display pixel illustrated and/or described herein. For example, in some embodiments, one or more display pixels included in display portion 1104 and/or display portion 1106 can be display pixel 100, display pixel 220, display pixel 240, display pixel 260, display pixel 520, display pixel 540, display pixel 560, display pixel 920, display pixel 940, and/or display pixel 960 illustrated and described herein.

In some embodiments, a distance between display portion 1104 and display portion 1106 (that is a camera distance) is around 25 mm. In some embodiments, display portion 1104 and display portion 1106 can be used to implement depth sensing. In some embodiments, display portion 1104 and display portion 1106 can be used to implement triangular depth sensing using image sensors within one or more display pixels at display portion 1104 and image sensors within one or more display pixels at display portion 1106. In some embodiments, display portion 1104 and display portion 1106 can be used to implement depth sensing in an environment in which a distance to a subject is in a range of 0.15 meters to 1 meter. In some embodiments, display 1102 is a mobile display being held (for example, by a user) in a panoramic mode, where a width of display 1102 is longer than a height of display 1102 based on how it is currently being situated (for example, based on how it is currently being held by a user).

Figure 12:
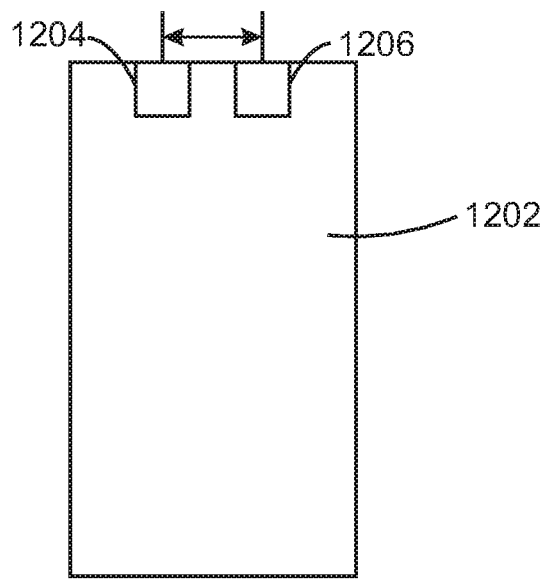
FIG. 12 illustrates a device with a display.

FIG. 12 illustrates a device 1200 according to some embodiments. In some embodiments, device 1200 is a computing device. In some embodiments, device 1200 is a mobile device. In some embodiments, device 1200 is a wearable device. In some embodiments, device 1200 is a watch and/or a watch that includes computing capabilities. In some embodiments, device 1200 is a phone. In some embodiments, device 1200 is a phone that includes computing capabilities. In some embodiments, device 1200 can be any device with a display.

In some embodiments, device 1200 includes a display 1202. In some embodiments, display 1202 includes display pixels with image sensors and/or IR sensors integrated with LEDs in the display pixels. In some embodiments, for example, display 1202 includes one or more display pixels as illustrated and/or described herein. For example, in some embodiments, one or more display pixels included in display 1202 can be any display pixel illustrated and/or described herein. For example, in some embodiments, one or more display pixels included in display 1202 can be display pixel 100, display pixel 220, display pixel 240, display pixel 260, display pixel 520, display pixel 540, display pixel 560, display pixel 920, display pixel 940, and/or display pixel 960 illustrated and described herein.

Display 1202 includes a display portion 1204 and a display portion 1206, separated by a distance illustrated by an arrow in FIG. 12. In some embodiments, the distance between display portions represented by the arrow in FIG. 12 is referred to as a camera distance. In some embodiments, display portion 1204 and/or display portion 1206 include groups of display pixels. In some embodiments, display portion 1204 and/or display portion 1206 are the same as and/or similar to display portion 580. In some embodiments, display portion 1204 and/or display portion 1206 are the same as and/or similar to display portion 980. In some embodiments, display portion 1204 and/or display portion 1206 include an array of four display groups by four display groups, where each display group includes three display pixels. In some embodiments, one or more display pixels included in display portions 1204 and/or display portion 1206 can be any display pixel illustrated and/or described herein. For example, in some embodiments, one or more display pixels included in display portion 1204 and/or display portion 1206 can be display pixel 100, display pixel 220, display pixel 240, display pixel 260, display pixel 520, display pixel 540, display pixel 560, display pixel 920, display pixel 940, and/or display pixel 960 illustrated and described herein.

In some embodiments, a distance between display portion 1204 and display portion 1206 (that is, a camera distance) is around 25 mm. In some embodiments, display portion 1204 and display portion 1206 can be used to implement depth sensing. In some embodiments, display portion 1204 and display portion 1206 can be used to implement triangular depth sensing using image sensors within one or more display pixels at display portion 1204 and image sensors within one or more display pixels at display portion 1206. In some embodiments, display portion 1204 and display portion 1206 can be used to implement depth sensing in an environment in which a distance to a subject is in a range of 0.15 meters to 1 meter. In some embodiments, display 1202 is a mobile display being held (for example, by a user) in a panoramic mode, where a width of display 1202 is longer than a height of display 1002 based on how it is currently being situated (for example, based on how it is currently being held by a user).

In some embodiments using a depth sensing method such as a triangular depth sensing method, for example, a depth measurement range is determined based on camera distance (for example, based on the distance between display portions illustrated by arrows in FIG. 10 corresponding to the distance between display portions 1004 and 1006, by arrows in FIG. 11 corresponding to the distance between display portions 1104 and 1106, or by arrows in FIG. 12 corresponding to the distance between display portions 1204 and 1206).

In some embodiments illustrated in FIGS. 10, 11 and/or 12, for example, display pixel image sensors to be used for depth sensing can be chosen automatically and/or with user input, depending on a distance from the image sensors to the intended object for which depth sense information is desired. These image sensors can be at different distances from each other under different circumstances (that is, for example, under different distances to desired depth sense objects), since image sensors can be distributed throughout the display at the various display pixels. In some embodiments, a user can adjust the distance between image sensors to be used for depth sensing (for example, in a manner similar to a zoom feature on a camera). In some embodiments, a distance between image sensors to be used for depth sensing can be dynamically adjusted by the device (for example, in a manner similar to an autofocus feature and/or auto-depth optimization, and/or using a processor such as an application processor). In some embodiments, a distance can be used that is a distance between eyes of a particular user or between the eyes of an average user, etc. (for example, 55 mm, or a sliding distance of 52 mm to 74 mm).

Figure 13:
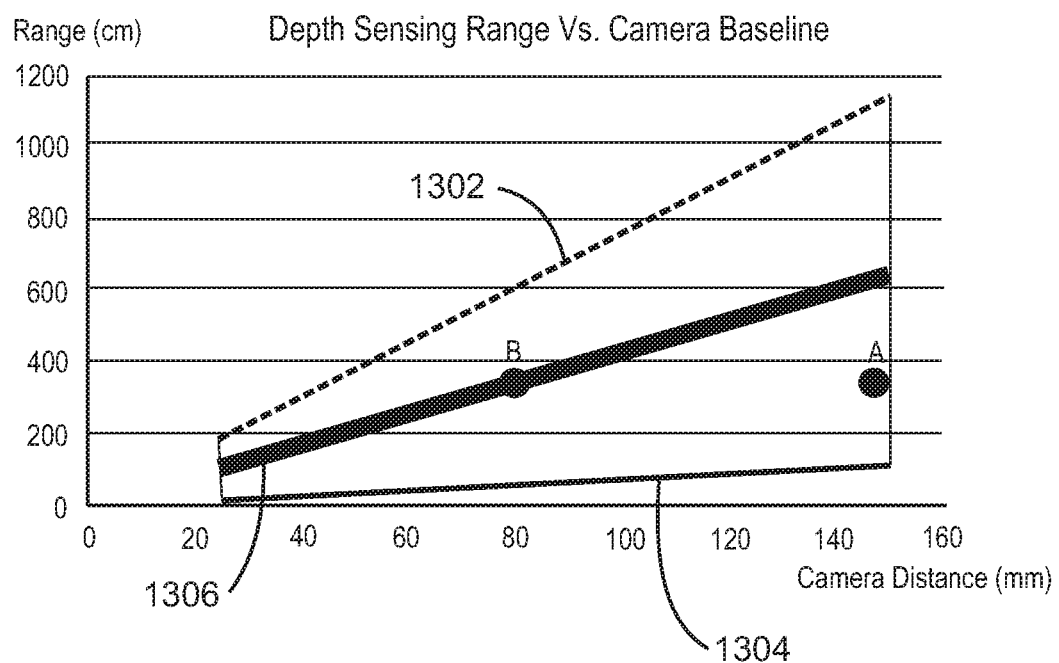
FIG. 13 illustrates a graph showing a depth sensing range.

FIG. 13 illustrates depth sensing graph 1300 showing a depth sensing range in centimeters on the vertical axis and a camera distance in millimeters on the horizontal axis. In some embodiments, FIG. 13 illustrates a depth sensing range and a camera baseline. Dotted line 1302 illustrates a maximum depth and solid line 1304 illustrates a minimum depth according to some embodiments. Thicker line 1306 represents a preferred depth accuracy zone according to some embodiments.

In depth sensing such as triangular depth sensing, a depth measurement range is determined by a camera distance (for example, a camera distance as shown by arrows in FIG. 10, FIG. 11 and/or FIG. 12). A preferred depth accuracy can be achieved around a center of the range represented by thick line 1306. In some embodiments, the camera distance is dynamically adjustable. For example, at a beginning of depth measurement, a longer range mode may be used (for example, with a 150 mm camera distance), and a depth is determined of 3 meters at point A in FIG. 13. In some embodiments, an autorange method is used to search for a point that can achieve a better (and/or best) depth accuracy at a 3 meter range, and selects point B in FIG. 13, for example. It is thus determined that 80 mm is the best camera distance for this distance and subject. The system then re-measures to determine a more accurate depth (range) measurement, for example, using triangular depth sensing.

In some embodiments, a display with 400 lines and 400 columns can include a pixel array with a number of pixels. For example, in some embodiments, a number of pixels in an array may include a number of pixels equal to 400×400 pixel groups (160,000 pixel groups) times the number of colors. For example, in some embodiments there are three colors in a red green blue (or RGB) system, and there would be 480,000 pixels (and 960,000 LEDs in embodiments with two LEDs per pixel) for the 400×400 display (400 times 400 pixel groups results in 160,000 pixel groups times 3 equals 480,000 pixels, since each color could have a separate pixel for each of the pixel groups in the array).

Figure 14:
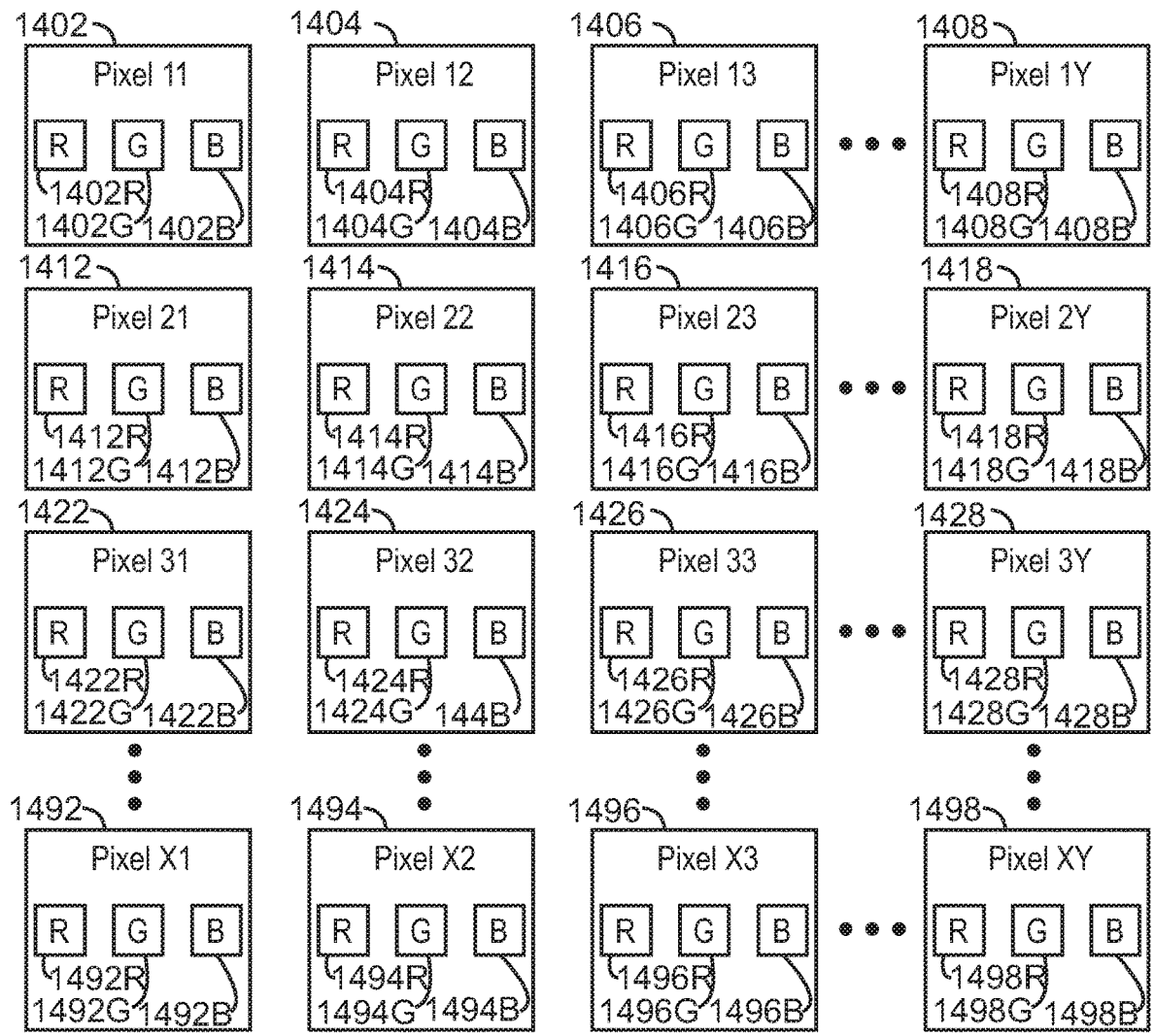
FIG. 14 illustrates an array of display pixels.

FIG. 14 illustrates a display pixel array 1400 (for example, a mobile display pixel array, and/or a micro LED pixel array, etc). Pixel array 1400 displays pixel groups in X rows and Y columns. In some embodiments, pixel array system 1400 displays pixel groups in 400 rows and 400 columns. Each pixel group in the pixel array system 1400 includes a number of pixels, one for each color. For example, as illustrated in FIG. 1400, each pixel group includes a pixel for each of a number of colors in the display pixel array. For example, as illustrated in FIG. 14, a separate pixel is illustrated in each pixel group for each of red (R), blue (B), and green (G) pixels. FIG. 14 illustrates X pixel groups in each column and Y pixel groups in each row. Row 1 includes pixel group 11 (1402) with a red pixel 1402R, a green pixel 1402G and a blue pixel 1402B, pixel group 12 (1404) with a red pixel 1404R, a green pixel 1404G and a blue pixel 1404B, pixel group 13 (1406) with a red pixel 1406R, a green pixel 1406G and a blue pixel 1406B, . . . , pixel group 1Y (1408) with a red pixel 1408R, a green pixel 1408G and a blue pixel 1408B. Row 2 includes pixel group 21 (1412) with a red pixel 1412R, a green pixel 1412G and a blue pixel 1412B, pixel group 22 (1414) with a red pixel 1414R, a green pixel 1414G and a blue pixel 1414B, pixel group 23 (1416) with a red pixel 1416R, a green pixel 1416G and a blue pixel 1416B, . . . , pixel group 2Y (1418) with a red pixel 1418R, a green pixel 1418G and a blue pixel 1418B. Row 3 includes pixel group 31 (1422) with a red pixel 1422R, a green pixel 1422G and a blue pixel 1422B, pixel group 32 (1424) with a red pixel 1424R, a green pixel 1424G and a blue pixel 1424B, pixel group 33 (1426) with a red pixel 1426R, a green pixel 1426G and a blue pixel 1426B, . . . , pixel group 3Y (1428) with a red pixel 1428R, a green pixel 1428G and a blue pixel 1428B. Row X includes pixel group X1 (1492) with a red pixel 1492R, a green pixel 1492G and a blue pixel 1492B, pixel group X2 (1494) with a red pixel 1494R, a green pixel 1494G and a blue pixel 1494B, pixel group X3 (1496) with a red pixel 1496R, a green pixel 1496G and a blue pixel 1496B, . . . , pixel group XY (1498) with a red pixel 1498R, a green pixel 1498G and a blue pixel 1498B.

In some embodiments, one or more (and/or each) of the pixels in the system 1400 (for example, pixels 1402R, 1402G, 1402B, 1404R, 1404G, 1404B, 1406R, 1406G, 1406B, . . . , 1408R, 1408G, 1408B, 1412R, 1412G, 1412B, 1414R, 1414G, 1414B, 1416R, 1416G, 1416B, . . . , 1418R, 1418G, 1418B, 1422R, 1422G, 1422B, 1424R, 1424G, 1424B, 1426R, 1426G, 1426B, . . . , 1428R, 1428G, 1428B, . . . , 1492R, 1492G, 1492B, 1494R, 1494G, 1494B, 1496R, 1496G, 1496B, . . . , 1498R, 1498G, 1498B, etc.) may be implemented using one or more of the pixels 100, 220, 240, 260, 520, 530, 560, 920, 940, 960, etc. described herein.

In some embodiments, one or more (and/or each) of the pixel groups in the system 1400 (for example, pixel group 1402, 1404, 1406, . . . , 1408, 1412, 1414, 1416, . . . , 1418, 1422, 1424, 1426, . . . , 1428, . . . , 1492, 1494, 1496, . . . , 1498, etc. may be implemented using one or more of the pixel groups 200, 520/540/560, 920/940/960, etc. described herein.

In some embodiments, multiple LEDs (for example, μLEDs) are arranged (for example, in parallel with each other) for each pixel in a display (for example, for fault tolerance and/or redundancy purposes). For example, in some embodiments, multiple redundant LEDs (for example, LED 102 and 104, LED 222 and 224, LED 242 and 244, LED 262 and 264, LED 522 and 524, LED 542 and 544, LED 562 and 564, LED 922 and 924, LED 942 and 94, LED 962 and 964, etc.) are arranged (for example in parallel) for each pixel in a display. For example, redundant LEDs may be used where those redundant LEDs together provide brightness for a single pixel (and/or single color for each pixel group) in a display array of pixels (for example, a mobile display array of pixels). In this manner, redundant LEDs may be used to provide a fault tolerance relating to the LEDs. In this manner, if one LED is not working for some reason, one or more other LEDs still provide the same amount of luminance that all of the LEDs would have together provided in parallel. While two redundant LEDs have been illustrated and described herein, according to some embodiments, one single LED can be used per pixel. Similarly, according to some embodiments, more than two LEDs can be used per pixel. It is noted that embodiments are not limited to two LEDs per pixel as illustrated and described herein, since some embodiments can include one LED per pixel, some embodiments, can include three LEDs per pixel, and/or some embodiments can include four or more LEDs per pixel, for example.

FIG. 1500 is a block diagram of an example of a computing device 1500 that can include pixels in a display according to some embodiments. In some embodiments, any portion of the pixels, pixel groups, displays and/or systems, etc. illustrated in any one or more of the figures, and any of the embodiments described herein can be included in and/or be implemented by computing device 1500. The computing device 1500 may be, for example, a watch, wearable device, mobile phone, mobile device, handset, laptop computer, desktop computer, virtual reality (VR) system, augmented reality (AR) system, mixed reality system, head mounted display system, head worn display system, and/or tablet computer, etc., among others. The computing device 1500 may include a processor 1502 that is adapted to execute stored instructions, as well as a memory device 1504 (and/or storage device 1504) that stores instructions that are executable by the processor 1502. The processor 1502 can be a single core processor, a multi-core processor, a computing cluster, or any number of other configurations. For example, processor 1502 can be an Intel® processor such as an Intel® Celeron, Pentium, Core, Core i3, Core i5, or Core i7 processor. In some embodiments, processor 1502 can be an Intel® x86 based processor. In some embodiments, processor 1502 can be an ARM based processor. The memory device 1504 can be a memory device and/or a storage device, and can include volatile storage, non-volatile storage, random access memory, read only memory, flash memory, and/or any other suitable memory and/or storage systems. The instructions that are executed by the processor 1502 may also be used to implement display driver control as described in this specification.

The processor 1502 may also be linked through the system interconnect 1506 (e.g., PCI®, PCI-Express®, NuBus, etc.) to a display interface 1508 adapted to connect the computing device 1500 to a display device 1510. The display device 1510 may include a display screen that is a built-in component of the computing device 1500. The display device 1510 may also include a computer monitor, television, or projector, among others, that is externally connected to the computing device 1500. The display device 1510 can include light emitting diodes (LEDs), organic light emitting diodes (OLEDs), and/or micro-LEDs (μLEDs), among others.

In some embodiments, the display interface 1508 can include any suitable graphics processing unit, transmitter, port, physical interconnect, and the like. In some examples, the display interface 1508 can implement any suitable protocol for transmitting data to the display device 1510. For example, the display interface 1508 can transmit data using a high-definition multimedia interface (HDMI) protocol, a DisplayPort protocol, or some other protocol or communication link, and the like In some embodiments, display device 1510 includes a display controller 1530. In some embodiments, the display controller 1530 can provide control signals within and/or to the display device 1510. In some embodiments, display controller 1530 can be included in the display interface 1508 (and/or instead of the display interface 1508). In some embodiments, display controller 1530 can be coupled between the display interface 1508 and the display device 1510. In some embodiments, the display controller 1530 can be coupled between the display interface 1508 and the interconnect 1506. In some embodiments, the display controller 1530 can be included in the processor 1502. In some embodiments, display controller 1530 can implement control of a display pixel array of display device 1510 according to any of the display pixel arrays, pixels, pixel groups, displays, etc. described herein (for example, as illustrated in and described in reference to any of the drawings and as described anywhere herein). In some embodiments, display controller 1530 and/or display device 1510 can include a display pixel array system such as system 1400 of FIG. 14.

In addition, a network interface controller (also referred to herein as a NIC) 1512 may be adapted to connect the computing device 1500 through the system interconnect 1506 to a network (not depicted). The network (not depicted) may be a wireless network, a wired network, cellular network, a radio network, a wide area network (WAN), a local area network (LAN), a global position satellite (GPS) network, and/or the Internet, among others.

The processor 1502 may be connected through system interconnect 1506 to an input/output (I/O) device interface 1514 adapted to connect the computing host device 1500 to one or more I/O devices 1516. The I/O devices 1516 may include, for example, a keyboard and/or a pointing device, where the pointing device may include a touchpad or a touchscreen, among others. The I/O devices 1516 may be built-in components of the computing device 1500, or may be devices that are externally connected to the computing device 1500.

In some embodiments, the processor 1502 may also be linked through the system interconnect 1506 to a storage device 1518 that can include a hard drive, a solid state drive (SSD), a magnetic drive, an optical drive, a portable drive, a flash drive, a Universal Serial Bus (USB) flash drive, an array of drives, and/or any other type of storage, including combinations thereof. In some embodiments, the storage device 1518 can include any suitable applications. In some embodiments, the storage device 1518 can include a basic input/output system (BIOS) 1520.

Figure 15:
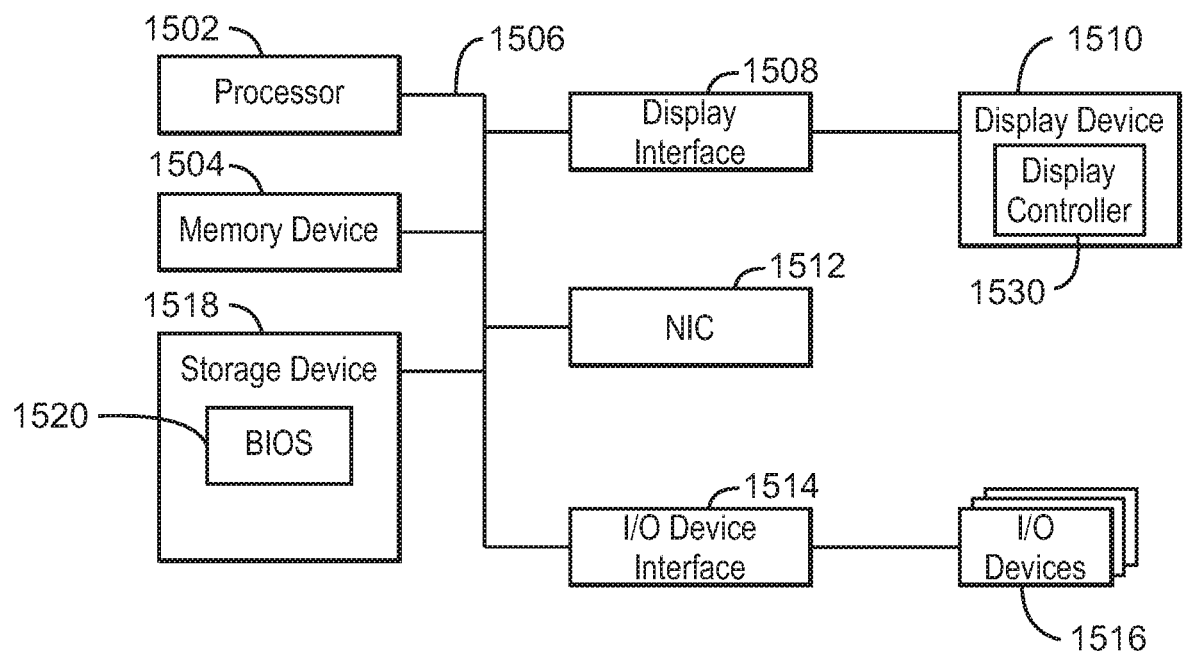
FIG. 15 illustrates a computing device system.

It is to be understood that the block diagram of FIG. 15 is not intended to indicate that the computing device 1500 is to include all of the components shown in FIG. 15. Rather, the computing device 1500 can include fewer or additional components not illustrated in FIG. 15 (e.g., additional memory components, embedded controllers, additional modules, additional network interfaces, etc.). Furthermore, any of the functionalities of the BIOS 1520 may be partially, or entirely, implemented in hardware and/or in the processor 1502. For example, the functionality may be implemented with an application specific integrated circuit, logic implemented in an embedded controller, or in logic implemented in the processor 1502, among others. In some embodiments, the functionalities of the BIOS 1520 can be implemented with logic, wherein the logic, as referred to herein, can include any suitable hardware (e.g., a processor, among others), software (e.g., an application, among others), firmware, or any suitable combination of hardware, software, and firmware.

Figure 16:
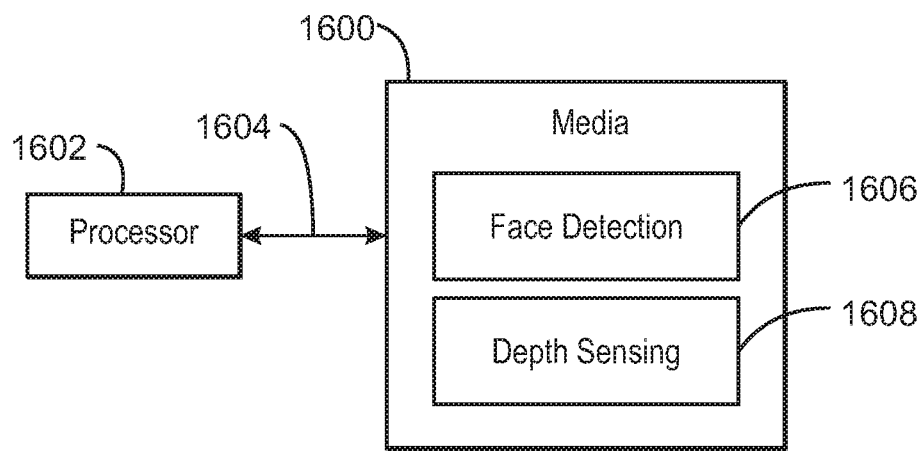
FIG. 16 illustrates one or more processor and one or more tangible, non-transitory, computer-readable media.

FIG. 16 is a block diagram of an example of one or more processor and one or more tangible, non-transitory computer readable media. The one or more tangible, non-transitory, computer-readable media 1600 may be accessed by a processor 1602 over a computer interconnect 1604. Furthermore, the one or more tangible, non-transitory, computer-readable media 1600 may include code to direct the processor 1602 to perform operations as described herein. In some embodiments, processor 1602 is one or more processors. In some embodiments, processor 1602 can perform similarly to (and/or the same as) processor 1502 of FIG. 15, and/or can perform some or all of the same functions as can be performed by processor 1502.

Various components discussed in this specification may be implemented using software components. These software components may be stored on the one or more tangible, non-transitory, computer-readable media 1600, as indicated in FIG. 16. For example, face detection 1606 and/or depth sensing 1608 may be adapted to direct the processor 1602 to perform one or more of any of the operations described in this specification and/or in reference to the drawings.

It is to be understood that any suitable number of the software components shown in FIG. 16 may be included within the one or more tangible, non-transitory computer-readable media 1600. Furthermore, any number of additional software components not shown in FIG. 16 may be included within the one or more tangible, non-transitory, computer-readable media 1600, depending on the specific application.

It is noted that although display pixels are illustrated herein as having two LEDs, in some embodiments any number of LEDs and/or other types of light emitting devices may be included in the display pixel. In some embodiments, more than one LED (or other light emitting device) are included for redundancy purposes in case an LED (or light other light emitting device) is not working properly, for example.

In some embodiments, infrared (IR) illuminators such as, for example, IR illuminators 314, 404, 604, 804, etc. can provide IR illumination (and/or IR projection) to project a pattern of IR light on one or more objects. In some embodiments, IR sensors such as, for example, one or more of display pixel IR sensors 118, 238, 258, 278, 538, 558, 578, 938, 958, 978, etc. (which can be, for example, IR camera sensors) can sense the projected pattern of IR light on the one or more objects at one or more display pixel location. In response to the projected and sensed IR light, a processor (for example, processor 1502 and/or processor 1602) can be used to perform depth sensing on the projected and sensed IR light to determine image depths according to some embodiments. In some embodiments, other processors can be used (for example, an application processor that is specifically used as a depth sensing processor). In some embodiments, one or more display pixel image sensor (for example, one or more of image sensors 106, 226, 246, 266, 526, 546, 566, 926, 946, 966, etc.) may also be used to help enable depth sensing.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1

In some examples, a display including an array of display pixels. Each display pixel includes at least one light-emitting diode. At least one of the display pixels includes an image sensor.

Example 2

In some examples, the display of Example 1, where each of the at least one light-emitting diodes includes micro light-emitting diodes.

Example 3

In some examples, the display of Example 1, where each display pixel includes an image sensor.

Example 4

In some examples, the display of Example 1, including a micro lens on the image sensor.

Example 5

In some examples, the display of Example 1, where at least one of the display pixels includes an infrared sensor.

Example 6

In some examples, the display of Example 1, where at least one of the display pixels includes a storage device.

Example 7

In some examples, the display of Example 1, where at least one of the display pixels includes one or more image sensors, one or more camera sensors, one or more touch sensors, one or more pressure sensors, one or more vibration sensors, one or more temperature sensors, one or more accelerometers, one or more gyroscopes, one or more infrared sensors, one or more infrared light-emitting diodes, one or more ambient light sensors, one or more memory, one or more storage, one or more memory devices, one or more memory cells, one or more storage devices, one or more solid state storage devices, one or more random access memory devices, one or more random access memory cells, one or more static random access memory devices, one or more static random access memory cells, one or more dynamic random access memory devices, one or more dynamic random access memory cells, and/or one or more logic devices. That is, one or more of the display pixels includes at least one image sensor, and/or at least one camera sensor, and/or at least one touch sensor, and/or at least one pressure sensor, and/or at least one vibration sensor, and/or at least one temperature sensor, and/or at least one accelerometer, and/or at least one gyroscope, and/or at least one infrared sensor, and/or at least one infrared light-emitting diode, and/or at least one ambient light sensor, and/or at least one memory, and/or at least one storage, and/or at least one memory device, and/or at least one memory cell, and/or at least one storage device, and/or at least one solid state storage device, and/or at least one random access memory device, and/or at least one random access memory cell, and/or at least one static random access memory device, and/or at least one static random access memory cell, and/or at least one dynamic random access memory device, and/or at least one dynamic random access memory cell, and/or at least one logic device.

Example 8

In some examples, the display of Example 1, where the image sensor is a complementary metal oxide semiconductor (CMOS) camera sensor.

Example 9

In some examples, the display of Example 1, where at least two of the display pixels include an image sensor.

Example 10

In some examples, the display of Example 9, including a processor to implement depth sensing in response to the image sensor of at least two of the display pixels.

Example 11

In some examples, the display of Example 5, including a processor to implement depth sensing in response to the infrared sensor of at least one of the display pixels.

Example 12

In some examples, the display of Example 1, including a processor to implement face detection in response to the image sensor.

Example 13

In some examples, the display of Example 1, including a processor to implement face login in response to the image sensor.

Example 14

In some examples, the display of Example 1, the at least one of the display pixels including a substrate. The at least one light-emitting diode of the at least one display pixel and the image sensor of the at least one display pixel are both included on the substrate.

Example 15

In some examples, a display pixel includes at least one light-emitting diode and an image sensor.

Example 16

In some examples, the display pixel of Example 15, where each of the at least one light-emitting diodes includes micro light-emitting diodes.

Example 17

In some examples, the display pixel of Example 15, including a micro lens on the image sensor.

Example 18

In some examples, the display pixel of Example 15, including an infrared sensor.

Example 19

In some examples, the display pixel of Example 15, including a storage device.

Example 20

In some examples, the display pixel of Example 15, including one or more image sensors, and/or one or more camera sensors, and/or one or more touch sensors, and/or one or more pressure sensors, and/or one or more vibration sensors, and/or one or more temperature sensors, and/or one or more accelerometers, and/or one or more gyroscopes, and/or one or more infrared sensors, and/or one or more infrared light-emitting diodes, and/or one or more ambient light sensors, and/or one or more memory, and/or one or more storage, and/or one or more memory devices, and/or one or more memory cells, and/or one or more storage devices, and/or one or more solid state storage devices, and/or one or more random access memory devices, and/or one or more random access memory cells, and/or one or more static random access memory devices, and/or one or more static random access memory cells, and/or one or more dynamic random access memory devices, and/or one or more dynamic random access memory cells, and/or one or more logic devices.

Example 21

In some examples, the display pixel of Example 15, where the image sensor is a complementary metal oxide semiconductor (CMOS) camera sensor.

Example 22

In some examples, the display pixel of Example 15, including a substrate. The at least one light-emitting diode and the image sensor are both included on the substrate.

Example 23

In some examples, a method includes implementing depth sensing in response to a sensor integrated with at least one light-emitting diode in a display pixel.

Example 24

In some examples, the method of Example 23, where the sensor is an image sensor and/or an infrared sensor.

Example 25

In some examples, the method of Example 24, including implementing face detection in response to the image sensor.

Example 26

In some examples, one or more tangible, non-transitory machine readable media includes a plurality of instructions. In response to being executed on at least one processor, the instructions cause the at least one processor to implement depth sensing in response to a sensor integrated with at least one light-emitting diode in a display pixel.

Example 27

In some examples, the one or more tangible, non-transitory machine readable media of Example 26, where the sensor is an image sensor and/or an infrared sensor.

Example 28

In some examples, the one or more tangible, non-transitory machine readable media of Example 27, including a plurality of instructions that, in response to being executed on the at least one processor, cause the at least one processor to implement face detection in response to the image sensor.

Example 29

In some examples, a display including an array of display pixels. Each display pixel includes at least one light-emitting diode. At least one of the display pixels includes an image sensor.

Example 30

In some examples, the display of Example 29, where each of the at least one light-emitting diodes is a micro light-emitting diode.

Example 31

In some examples, the display of Example 29, where each display pixel includes an image sensor.

Example 32

In some examples, the display of Example 29, including a micro lens on the image sensor.

Example 33

In some examples, the display of Example 29, at least one of the display pixels including an infrared sensor.

Example 34

In some examples, the display of Example 29, at least one of the display pixels including a storage device.

Example 35

In some examples, the display of Example 29, at least one of the display pixels including one or more image sensors, and/or one or more camera sensors, and/or one or more touch sensors, and/or one or more pressure sensors, and/or one or more vibration sensors, and/or one or more temperature sensors, and/or one or more accelerometers, and/or one or more gyroscopes, and/or one or more infrared sensors, and/or one or more infrared light-emitting diodes, and/or one or more ambient light sensors, and/or one or more memory, and/or one or more storage, and/or one or more memory devices, and/or one or more memory cells, and/or one or more storage devices, and/or one or more solid state storage devices, and/or one or more random access memory devices, and/or one or more random access memory cells, and/or one or more static random access memory devices, and/or one or more static random access memory cells, and/or one or more dynamic random access memory devices, and/or one or more dynamic random access memory cells, and/or one or more logic devices.

Example 36

In some examples, the display of Example 29, where the image sensor is a complementary metal oxide semiconductor (CMOS) camera sensor.

Example 37

In some examples, the display of Example 29, where at least two of the display pixels includes an image sensor.

Example 38

In some examples, the display of Example 37, including a processor to implement depth sensing in response to the image sensor of at least two of the display pixels.

Example 39

In some examples, the display of Example 33, including a processor to implement depth sensing in response to the infrared sensor of at least one of the display pixels.

Example 40

In some examples, the display of Example 29, including a processor to implement face detection in response to the image sensor.

Example 41

In some examples, the display of Example 29, including a processor to implement face login in response to the image sensor.

Example 42

In some examples, the display of any of Examples 29-41, the at least one of the display pixels including a substrate. The at least one light-emitting diode of the at least one display pixel and the image sensor of the at least one display pixel are both included on the substrate.

Example 43

In some examples, a display pixel includes at least one light-emitting diode and an image sensor.

Example 44

In some examples, the display pixel of Example 43, where each of the at least one light-emitting diodes is a micro light-emitting diode.

Example 45

In some examples, the display pixel of Example 43, including a micro lens on the image sensor.

Example 46

In some examples, the display pixel of Example 43, including one or more image sensors, and/or one or more camera sensors, and/or one or more touch sensors, and/or one or more pressure sensors, and/or one or more vibration sensors, and/or one or more temperature sensors, and/or one or more accelerometers, and/or one or more gyroscopes, and/or one or more infrared sensors, and/or one or more infrared light-emitting diodes, and/or one or more ambient light sensors, and/or one or more memory, and/or one or more storage, and/or one or more memory devices, and/or one or more memory cells, and/or one or more storage devices, and/or one or more solid state storage devices, and/or one or more random access memory devices, and/or one or more random access memory cells, and/or one or more static random access memory devices, and/or one or more static random access memory cells, and/or one or more dynamic random access memory devices, and/or one or more dynamic random access memory cells, and/or one or more logic devices.

Example 47

In some examples, the display pixel of any of Examples 43-46, including a substrate. The at least one light-emitting diode and the image sensor are both included on the substrate.

Example 48

In some examples, a method including implementing depth sensing in response to a sensor integrated with at least one light-emitting diode in a display pixel.

Example 49

In some examples, the display pixel of Example 48, where the sensor is an image sensor and/or an infrared sensor.

Example 50

In some examples, the display pixel of Example 49, including implementing face detection in response to the image sensor.

Example 51

In some examples, one or more tangible, non-transitory machine readable media includes a plurality of instructions. In response to being executed on at least one processor, the instructions cause the at least one processor to implement depth sensing in response to a sensor integrated with at least one light-emitting diode in a display pixel.

Example 52

In some examples, the one or more tangible, non-transitory machine readable media of Example 51, where the sensor is an image sensor and/or an infrared sensor.

Example 53

In some examples, the one or more tangible, non-transitory machine readable media of Example 52, including a plurality of instructions that, in response to being executed on the at least one processor, cause the at least one processor to implement face detection in response to the image sensor.

Example 54

In some examples, a display includes an array of display pixels. Each display pixel including at least one light-emitting diode, and at least one of the display pixels includes an image sensor.

Example 55

In some examples, the display of any of the preceding Examples, where each of the at least one light-emitting diodes is a micro light-emitting diode.

Example 56

In some examples, the display of any of the preceding Examples, including a micro lens on the image sensor.

Example 57

In some examples, the display of any of the preceding Examples, at least one of the display pixels including one or more image sensors, and/or one or more camera sensors, and/or or more touch sensors, and/or one or more pressure sensors, and/or one or more vibration sensors, and/or one or more temperature sensors, and/or one or more accelerometers, and/or one or more gyroscopes, and/or one or more infrared sensors, and/or one or more infrared light-emitting diodes, and/or one or more ambient light sensors, and/or one or more memory, and/or one or more storage, and/or one or more memory devices, and/or one or more memory cells, and/or one or more storage devices, and/or one or more solid state storage devices, and/or one or more random access memory devices, and/or one or more random access memory cells, and/or one or more static random access memory devices, and/or one or more static random access memory cells, and/or one or more dynamic random access memory devices, and/or one or more dynamic random access memory cells, and/or one or more logic devices.

Example 58

In some examples, the display of any of the preceding Examples, each of the display pixels including one or more image sensors, and/or one or more camera sensors, and/or one or more touch sensors, and/or one or more pressure sensors, and/or one or more vibration sensors, and/or one or more temperature sensors, and/or one or more accelerometers, and/or one or more gyroscopes, and/or one or more infrared sensors, and/or one or more infrared light-emitting diodes, and/or one or more ambient light sensors, and/or one or more memory, and/or more storage, and/or one or more memory devices, and/or one or more memory cells, and/or one or more storage devices, and/or one or more solid state storage devices, and/or one or more random access memory devices, and/or one or more random access memory cells, and/or one or more static random access memory devices, and/or one or more static random access memory cells, and/or one or more dynamic random access memory devices, and/or one or more dynamic random access memory cells, and/or one or more logic devices.

Example 59

In some examples, the display of any of the preceding Examples, where the image sensor is a complementary metal oxide semiconductor (CMOS) camera sensor.

Example 60

In some examples, the display of any of the preceding Examples, where at least two of the display pixels includes an image sensor.

Example 61

In some examples, the display of any of the preceding Examples, the at least one of the display pixels including a substrate. The at least one light-emitting diode of the at least one display pixel and the image sensor of the at least one display pixel are both included on the substrate.

Example 62

In some examples, a method includes implementing depth sensing on the display of any of the preceding Examples, the depth sensing implemented in response to an image sensor of at least one of the display pixels.

Example 63

In some examples, the method of Example 62, the depth sensing implemented in response to an image sensor of at least two of the display pixels.

Example 64

In some examples, the method of Example 62 or 63, including implementing depth sensing in response to an infrared sensor of at least one of the display pixels.

Example 65

In some examples, the method of any of Examples 62-64, including implementing face detection in response to an image sensor of at least one of the display pixels.

Example 66

In some examples, the method of any of Examples 62-65, including implementing face detection in response to an image sensor of at least one of the display pixels.

Example 67

In some examples, machine-readable storage including machine-readable instructions, when executed, to implement a method or realize an apparatus as in any preceding Example.

Although example embodiments of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, and/or the order of execution of the blocks in the diagrams may be changed, and/or some of the circuit elements in circuit diagrams, and blocks in block/flow diagrams described may be changed, eliminated, or combined. Any elements as illustrated and/or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile and/or non-volatile memory devices, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A display comprising:
    an array of display pixels, the array of display pixels including a plurality of display pixel groups, at least one of the display pixel groups including:
        a first display pixel including:
            a first substrate;
            a first light-emitting diode carried by the first substrate, the first light-emitting diode to emit light having a first color; and
            a first image sensor carried by the first substrate;
        a second display pixel adjacent the first display pixel, the second display pixel including:
            a second substrate separate from the first substrate;
            a second light-emitting diode carried by the second substrate, the second light-emitting diode to emit light having a second color different than the first color;
            a second image sensor carried by the second substrate; and
        a third display pixel adjacent the second display pixel, the third display pixel including:
            a third substrate separate from the first substrate and separate from the second substrate;
            a third light-emitting diode carried by the third substrate, the third light-emitting diode to emit light having a third color different than the first color and different than the second color; and
            a third image sensor carried by the third substrate.

2. The display of claim 1, wherein the first, second, and third light-emitting diodes are micro light-emitting diodes.

3. The display of claim 1, wherein each of the display pixel groups includes a respective image sensor.

4. The display of claim 1, wherein the first display pixel includes a micro lens on the first image sensor.

5. The display of claim 1, wherein the first display pixel includes at least one of an infrared sensor carried by the first substrate or a storage device carried by the first substrate.

6. The display of claim 1, wherein at least one of the display pixels of the array of display pixels includes one or more of: one or more image sensors, one or more touch sensors, one or more pressure sensors, one or more vibration sensors, one or more temperature sensors, one or more accelerometers, one or more gyroscopes, one or more infrared sensors, one or more infrared light-emitting diodes, one or more ambient light sensors, one or more memory, one or more storage, one or more memory devices, one or more memory cells, one or more storage devices, one or more solid state storage devices, one or more random access memory devices, one or more random access memory cells, one or more static random access memory devices, one or more static random access memory cells, one or more dynamic random access memory devices, one or more dynamic random access memory cells, or one or more logic devices.

7. The display of claim 1, wherein the first image sensor is a complementary metal oxide semiconductor (CMOS) camera sensor.

8. The display of claim 1, wherein each of the display pixels of the array of display pixels includes a respective image sensor carried by a respective substrate.

9. The display of claim 8, further including a processor to implement depth sensing based on outputs by image sensors of at least two of the display pixels of the array of display pixels.

10. The display of claim 9, wherein the at least one display pixel group is a first display pixel group, one of the at least two display pixels is the first, second, or third display pixel of the first display pixel group, and another one of the at least two display pixels is in a second display pixel group different than the first display pixel group.

11. The display of claim 5, further including a processor to implement depth sensing based on an output of the infrared sensor.

12. The display of claim 1, further including a processor to implement face detection based on one or more outputs of at least one of the first image sensor, the second image sensor, or the third image sensor.

13. The display of claim 1, further including a processor to implement face login based on one or more outputs of at least one of the first image sensor, the second image sensor, or the third image sensor.

14. The display of claim 1, wherein one of the first, second, or third colors is red, one of the first, second, or third colors is blue, and one of the first, second, or third colors is green.

15. A display pixel comprising:
    a substrate;
    a first light-emitting diode carried by the substrate;
    a second light-emitting diode carried by the substrate, the first and second light-emitting diodes to emit light having a same color; and
    an image sensor carried by the substrate.

16. The display pixel of claim 15, wherein the first and second light-emitting diodes are micro light-emitting diodes.

17. The display pixel of claim 15, further including a micro lens on the image sensor.

18. The display pixel of claim 15, further including at least one of an infrared sensor carried by the substrate or a storage device carried by the substrate.

19. The display pixel of claim 15, further including at least one of one or more touch sensors, one or more pressure sensors, one or more vibration sensors, one or more temperature sensors, one or more accelerometers, one or more gyroscopes, one or more infrared sensors, one or more infrared light-emitting diodes, one or more ambient light sensors, one or more memory, one or more storage, one or more memory devices, one or more memory cells, one or more storage devices, one or more solid state storage devices, one or more random access memory devices, one or more random access memory cells, one or more static random access memory devices, one or more static random access memory cells, one or more dynamic random access memory devices, one or more dynamic random access memory cells, or one or more logic devices.

20. The display pixel of claim 15, wherein the image sensor is between the first and second light-emitting diodes.

21. The display pixel of claim 15, wherein the first light-emitting diode is adjacent a first edge of the substrate and the second light-emitting diode is adjacent a second edge of the substrate opposite the first edge.

22. A method comprising:
  collecting first image data with a first image sensor of a first display pixel of a plurality of display pixels;
  collecting second image data with another image sensor of another display pixel of the plurality of display pixels, the plurality of display pixels including a display pixel group including:
    the first display pixel including:
      a first substrate;
      a first light-emitting diode carried by the first substrate, the first light-emitting diode to emit light having a first color; and
      a first image sensor carried by the first substrate;
    a second display pixel adjacent the first display pixel, the second display pixel including;
      a second substrate separate from the first substrate;
      a second light-emitting diode carried by the second substrate, the second light-emitting diode to emit light having a second color different than the first color; and
      a second image sensor carried by the second substrate; and
    a third display pixel adjacent the second display pixel, the third display pixel including:
      a third substrate separate from the first substrate and separate from the second substrate;
      a third light-emitting diode carried by the third substrate, the third light-emitting diode to emit light having a third color different than the first color and different than the second color; and
      a third image sensor carried by the third substrate; and
  processing the first and second image data to sense a depth.

23. The method of claim 22, further including sensing the depth based on an output by an infrared sensor carried by the first substrate.

24. The method of claim 22, further including implementing face detection based on outputs by at least one of the first image sensor or the another image sensor.

25. One or more tangible, non-transitory machine readable media comprising instructions that, in response to being executed on at least one processor, cause the at least one processor to:
  collect first image data with a first image sensor of a first display pixel of a plurality of display pixels;
  collect second image data with another image sensor of another display pixel of the plurality of display pixels, the plurality of display pixels including a display pixel group including:
    the first display pixel including:
      a first substrate;
      a first light-emitting diode carried by the first substrate, the first light-emitting diode to emit light having a first color; and
      a first image sensor carried by the first substrate;
    a second display pixel adjacent the first display pixel, the second display pixel including;
      a second substrate separate from the first substrate;
      a second light-emitting diode carried by the second substrate, the second light-emitting diode to emit light having a second color different than the first color; and
      a second image sensor carried by the second substrate; and
    a third display pixel adjacent the second display pixel, the third display pixel including:
      a third substrate separate from the first substrate and separate from the second substrate;
      a third light-emitting diode carried by the third substrate, the third light-emitting diode to emit light having a third color different than the first color and different than the second color; and
      a third image sensor carried by the third substrate; and
  processing the first and second image data to sense a depth.

26. The one or more tangible, non-transitory machine readable media of claim 25, wherein the instructions, when executed on the at least one processor, cause the at least one processor to sense the depth based on an output by an infrared sensor carried by the first substrate.

27. The one or more tangible, non-transitory machine readable media of claim 26, wherein the instructions, when executed on the at least one processor, cause the at least one processor to:
  implement face detection based on outputs by at least one of the first image sensor or the another image sensor.

* * * * *